US010589290B2

(12) United States Patent
Walcutt et al.

(10) Patent No.: US 10,589,290 B2
(45) Date of Patent: Mar. 17, 2020

(54) WASTE PROCESSING MACHINE FEED ASSIST SYSTEM

(71) Applicant: Bandit Industries, Inc., Remus, MI (US)

(72) Inventors: Timothy Ryan Walcutt, Remus, MI (US); Thomas Arthur Stickler, Remus, MI (US)

(73) Assignee: Bandit Industries, Inc., Remus, MI (US)

( * ) Notice: Subject to any disclaimer, the term of this patent is extended or adjusted under 35 U.S.C. 154(b) by 192 days.

(21) Appl. No.: 15/480,615

(22) Filed: Apr. 6, 2017

(65) Prior Publication Data
US 2017/0291177 A1 Oct. 12, 2017

Related U.S. Application Data

(60) Provisional application No. 62/319,006, filed on Apr. 6, 2016, provisional application No. 62/318,979, filed on Apr. 6, 2016.

(51) Int. Cl.
B02C 25/00 (2006.01)
B02C 18/22 (2006.01)
(Continued)

(52) U.S. Cl.
CPC ............ B02C 25/00 (2013.01); A01G 3/002 (2013.01); B02C 18/00 (2013.01);
(Continued)

(58) Field of Classification Search
CPC ..... B02C 25/00; B02C 18/2225; B02C 18/00; B02C 18/0084; B02C 23/02;
(Continued)

(56) References Cited

U.S. PATENT DOCUMENTS 104,548 A 6/1870 Brady
1,311,469 A 7/1919 Smith
(Continued)

FOREIGN PATENT DOCUMENTS

AU 1574502 A 12/2002
AU 763881 B2 7/2003
(Continued)

OTHER PUBLICATIONS

Brush Bandit Catalog; Bandit Industries, Inc.; 32 pages (2010).
Four Photos of Vermeer Prototype Chipper.
Bandit Model 150, 200+ & 250, The 12' Capacity Brush Disc-Style Chippers Brochure, Bandit Industries, Inc.; 4 pages (Jul. 1995).
Vermeer BC2000 Brush Chipper Brochure, Vermeer Manufacturing; 4 pages (1999).
(Continued)

Primary Examiner — Adam J Eiseman
Assistant Examiner — Mohammed S. Alawadi
(74) Attorney, Agent, or Firm — Howard & Howard Attorneys PLLC

(57) ABSTRACT

A waste processing machine for reducing material and having a feed assist system. A cutting assembly on a frame reduces material. A feed system on the frame directs material toward the cutting assembly. A winch assembly includes a line with a line end for securing material, and a driver on the frame to urge the line end toward the driver. A keeper fixed to the frame secures the line end. A sensor detects utilization between: a docked configuration with the line tensioned against between the driver and the keeper; and an undocked configuration with the line loosened. A control unit allows operation of the feed system in the docked configuration, and interrupts the feed system in the undocked configuration. A feed mechanism actuation bypasses the interrupted operation to advance material for a bypass period, and a limit mechanism overrides operation of the feed mechanism for a subsequent limit period.

15 Claims, 18 Drawing Sheets

(51) Int. Cl.
*B02C 18/00* (2006.01)
*B66D 1/56* (2006.01)
*B66D 1/48* (2006.01)
*B27L 11/02* (2006.01)
*B02C 23/02* (2006.01)
*A01G 3/00* (2006.01)

(52) U.S. Cl.
CPC ...... *B02C 18/0084* (2013.01); *B02C 18/2225* (2013.01); *B02C 23/02* (2013.01); *B27L 11/02* (2013.01); *B66D 1/485* (2013.01); *B66D 1/56* (2013.01); *B02C 2201/06* (2013.01)

(58) Field of Classification Search
CPC ..... B02C 2201/06; A01G 3/002; B27L 11/02; B66D 1/485; B66D 1/56
USPC ......................................................... 241/92
See application file for complete search history.

(56) References Cited

U.S. PATENT DOCUMENTS

| | | |
|---|---|---|
| 1,409,368 A | 3/1922 | Dudley |
| 1,874,007 A | 8/1932 | Heaton |
| 1,987,688 A | 1/1935 | Lamb |
| D104,548 S | 5/1937 | Brady |
| 2,131,402 A | 9/1938 | King |
| 2,428,085 A | 9/1947 | Largen |
| 2,487,305 A | 11/1949 | Bridegroom |
| 2,542,952 A | 2/1951 | White |
| 3,029,848 A | 4/1962 | Bombardier |
| 3,077,338 A | 2/1963 | Bergerson et al. |
| 3,092,273 A | 6/1963 | Schramm |
| 3,216,520 A | 11/1965 | Blonsky |
| 3,275,046 A | 9/1966 | Moyers et al. |
| 3,281,119 A | 10/1966 | Westfall |
| 3,282,450 A | 11/1966 | Atcheson |
| 3,340,912 A | 9/1967 | Williams et al. |
| 3,424,326 A | 1/1969 | Thatcher |
| 3,457,975 A | 7/1969 | Wehr et al. |
| 3,515,185 A | 6/1970 | Wehr et al. |
| 3,559,898 A | 2/1971 | Rinke |
| 3,595,161 A | 7/1971 | Webb |
| 3,630,243 A | 12/1971 | Hamilton et al. |
| 3,642,041 A | 2/1972 | Hamilton et al. |
| 3,777,375 A | 12/1973 | Smith |
| 3,841,507 A | 10/1974 | Barwise |
| 3,844,489 A | 10/1974 | Strong |
| 3,945,517 A | 3/1976 | Carley |
| 3,989,198 A | 11/1976 | Blasko |
| 4,076,061 A | 2/1978 | Greeninger |
| 4,102,528 A | 7/1978 | Cripe |
| 4,176,696 A | 12/1979 | Greeninger |
| 4,238,116 A | 12/1980 | Plante et al. |
| 4,315,652 A | 2/1982 | Barwise |
| 4,338,985 A | 7/1982 | Smith et al. |
| 4,365,927 A | 12/1982 | Schenck |
| 4,390,132 A | 6/1983 | Hutson et al. |
| 4,398,581 A | 8/1983 | Aikins et al. |
| 4,529,350 A | 7/1985 | Jones |
| 4,685,495 A | 8/1987 | Freeman |
| 4,805,676 A | 2/1989 | Aikins |
| 4,898,221 A | 2/1990 | Eriksson |
| RE33,233 E | 6/1990 | Freeman |
| 5,010,933 A | 4/1991 | Doyle |
| 5,088,532 A | 2/1992 | Eggers et al. |
| 5,349,999 A | 9/1994 | Peterson et al. |
| 5,362,004 A | 11/1994 | Bateman |
| 5,372,316 A | 12/1994 | Bateman |
| 5,413,286 A | 5/1995 | Bateman |
| 5,692,548 A | 12/1997 | Bouwers et al. |
| 5,692,549 A | 12/1997 | Eggers |
| 5,769,586 A | 6/1998 | Schulte |
| 5,863,003 A | 1/1999 | Smith |
| 5,988,539 A | 11/1999 | Morey |
| 6,000,642 A | 12/1999 | Morey |
| 6,016,855 A | 1/2000 | Morey |
| 6,032,707 A | 3/2000 | Morey et al. |
| 6,036,125 A | 3/2000 | Morey et al. |
| 6,047,912 A | 4/2000 | Smith |
| 6,059,210 A | 5/2000 | Smith |
| 6,076,572 A | 6/2000 | Cook |
| 6,138,932 A | 10/2000 | Moore |
| 6,138,991 A | 10/2000 | Myers, Jr. |
| 6,299,082 B1 | 10/2001 | Smith |
| 6,357,684 B1 | 3/2002 | Morey |
| 6,446,889 B1 | 9/2002 | Moore |
| 6,517,020 B1 | 2/2003 | Smith |
| 6,572,039 B1 | 6/2003 | Kruer et al. |
| 6,591,973 B2 | 7/2003 | Smith |
| 6,600,642 B1 | 7/2003 | Kames |
| 6,722,596 B1 | 4/2004 | Morey |
| 6,729,567 B1 | 5/2004 | Morey |
| 6,804,871 B1 | 10/2004 | Smith |
| 6,814,320 B1 | 11/2004 | Morey et al. |
| 6,830,204 B1 | 12/2004 | Morey |
| 6,845,931 B1 | 1/2005 | Smith |
| 6,955,310 B1 | 10/2005 | Morey |
| 7,007,874 B1 | 3/2006 | Smith |
| 7,011,124 B1 | 3/2006 | Morey |
| 7,011,258 B2 * | 3/2006 | O'Halloran ............ A01G 3/002 241/28 |
| 7,040,558 B2 | 5/2006 | Stelter et al. |
| 7,044,409 B2 | 5/2006 | Stelter et al. |
| 7,063,306 B2 | 6/2006 | Sanders et al. |
| 7,121,485 B2 | 10/2006 | Smith |
| 7,121,488 B1 | 10/2006 | Marriott et al. |
| 7,163,166 B1 | 1/2007 | Smith |
| 7,384,011 B1 | 6/2008 | Smith |
| 7,410,150 B1 | 8/2008 | Falls |
| 7,562,837 B2 | 7/2009 | Brand et al. |
| 7,726,594 B2 | 6/2010 | Smith |
| 7,819,348 B2 | 10/2010 | Bouwers et al. |
| 8,109,303 B1 | 2/2012 | Holmes |
| 8,584,718 B2 | 11/2013 | Holmes |
| 9,233,375 B2 | 1/2016 | Kennedy et al. |
| 9,636,687 B2 | 5/2017 | Kennedy et al. |
| 9,656,269 B2 | 5/2017 | Kennedy et al. |
| 2006/0196981 A1 | 9/2006 | Stelter et al. |
| 2007/0001038 A1 | 1/2007 | Bouwers et al. |
| 2007/0034295 A1 * | 2/2007 | Chapman ............ B02C 18/2283 144/356 |
| 2007/0104560 A1 | 5/2007 | Hall |
| 2008/0296420 A1 | 12/2008 | Brand et al. |
| 2009/0095828 A1 | 4/2009 | Bouwers et al. |
| 2011/0062266 A1 | 3/2011 | Smith |
| 2012/0043404 A1 | 2/2012 | Morey |
| 2013/0025744 A1 * | 1/2013 | Morey .................... B02C 25/00 144/424 |
| 2013/0026266 A1 | 1/2013 | Morey |
| 2013/0334346 A1 | 12/2013 | Morey |
| 2014/0138464 A1 | 5/2014 | Casper |
| 2014/0163741 A1 * | 6/2014 | Morey ................ B02C 18/2291 700/275 |
| 2014/0263775 A1 | 9/2014 | Satterwhite |
| 2016/0030945 A1 | 2/2016 | Kennedy et al. |
| 2016/0030946 A1 | 2/2016 | Kennedy et al. |
| 2017/0043350 A1 | 2/2017 | Beam, III |
| 2017/0137266 A1 | 5/2017 | Hoffend et al. |
| 2017/0291177 A1 | 10/2017 | Walcutt et al. |
| 2018/0162703 A1 | 6/2018 | Codd et al. |
| 2019/0128379 A1 | 5/2019 | Hall et al. |

FOREIGN PATENT DOCUMENTS

| | | |
|---|---|---|
| AU | 2009345114 A1 | 11/2010 |
| CA | 2103633 A1 | 3/1994 |
| CA | 2133119 A1 | 4/1995 |
| CA | 2133120 A1 | 4/1995 |
| CA | 2132942 A1 | 3/1996 |
| CA | 2354106 A1 | 8/1997 |
| CA | 2266176 A1 | 11/1999 |
| CA | 2381889 A1 | 12/2002 |

(56) References Cited

FOREIGN PATENT DOCUMENTS

| | | | |
|---|---|---|---|
| CA | 2354105 | C | 11/2004 |
| CA | 2742211 | A1 | 11/2010 |
| DE | 3240385 | A1 | 5/1984 |
| DE | 4416195 | A1 | 11/1994 |
| EP | 1266692 | A3 | 9/2004 |
| EP | 1186345 | B1 | 3/2011 |
| EP | 2424673 | A1 | 3/2012 |
| EP | 1952888 | B1 | 8/2012 |
| JP | 2002177806 | A | 6/2002 |
| JP | 2003103193 | A | 4/2003 |
| SU | 674730 | A1 | 7/1979 |
| WO | 2010126541 | A1 | 11/2010 |
| WO | 2013013233 | A1 | 1/2013 |
| WO | 2013138480 | A1 | 9/2013 |
| WO | 2013188865 | A1 | 12/2013 |

OTHER PUBLICATIONS

English language abstract and computer-generated translation for JP2003103193 extracted from espacenet.com Sep. 21, 2017; 9 pages.

English language abstract and computer-generated translation for JP2002177806 extracted from espacenet.com database Sep. 21, 2017; 9 pages.

English language abstract and computer-generated translation for DE3240385 extracted from espacenet.com database Sep. 21, 2017; 4 pages.

English language astract for SU674730 not found; however, see computer-generated translation extracted from espacenet.com Oct. 5, 2017; 3 pages.

English language abstract and computer-generated translation for DE4416195 extracted from espacenet.com Sep. 21, 2017; 7 pages.

\* cited by examiner

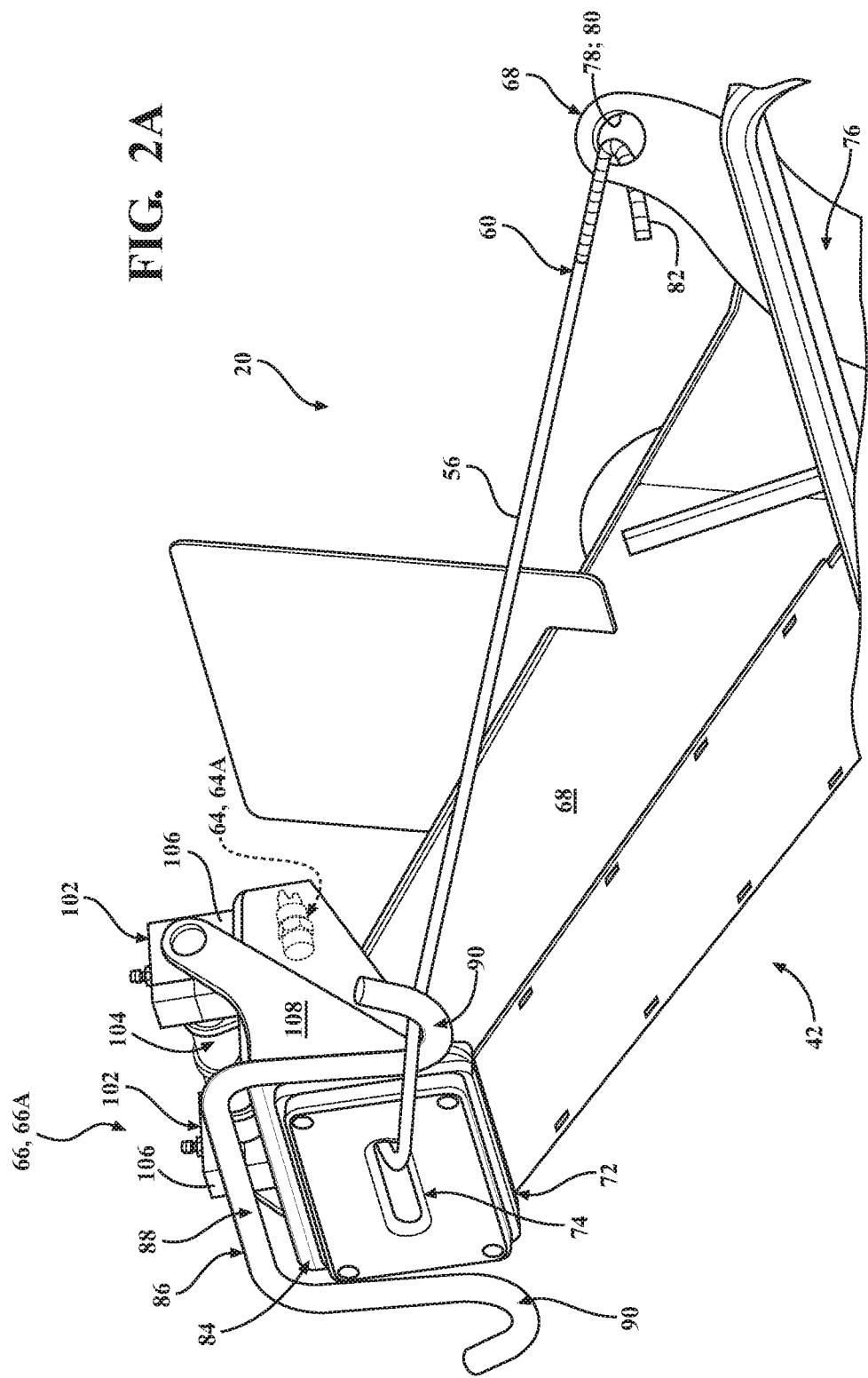

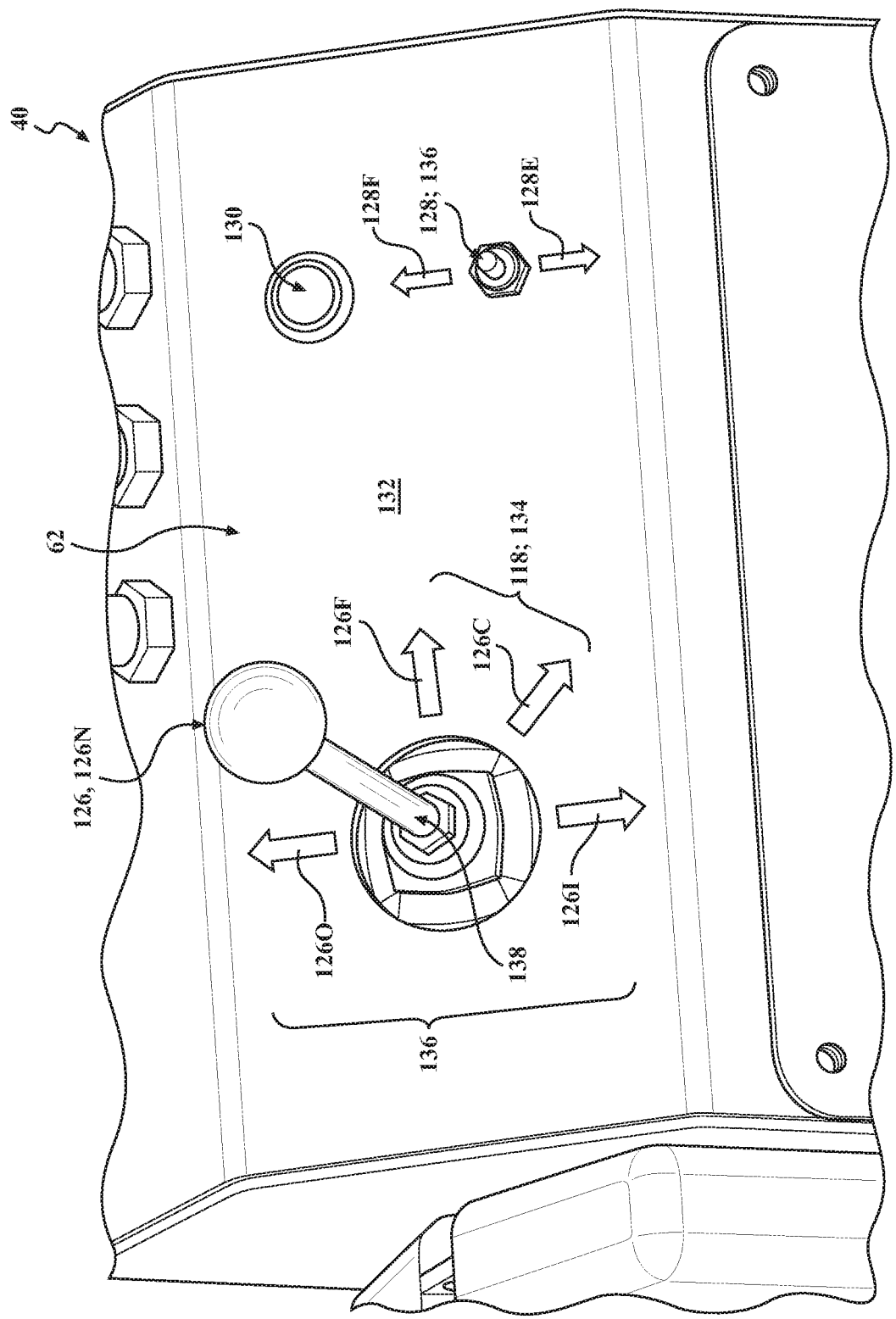

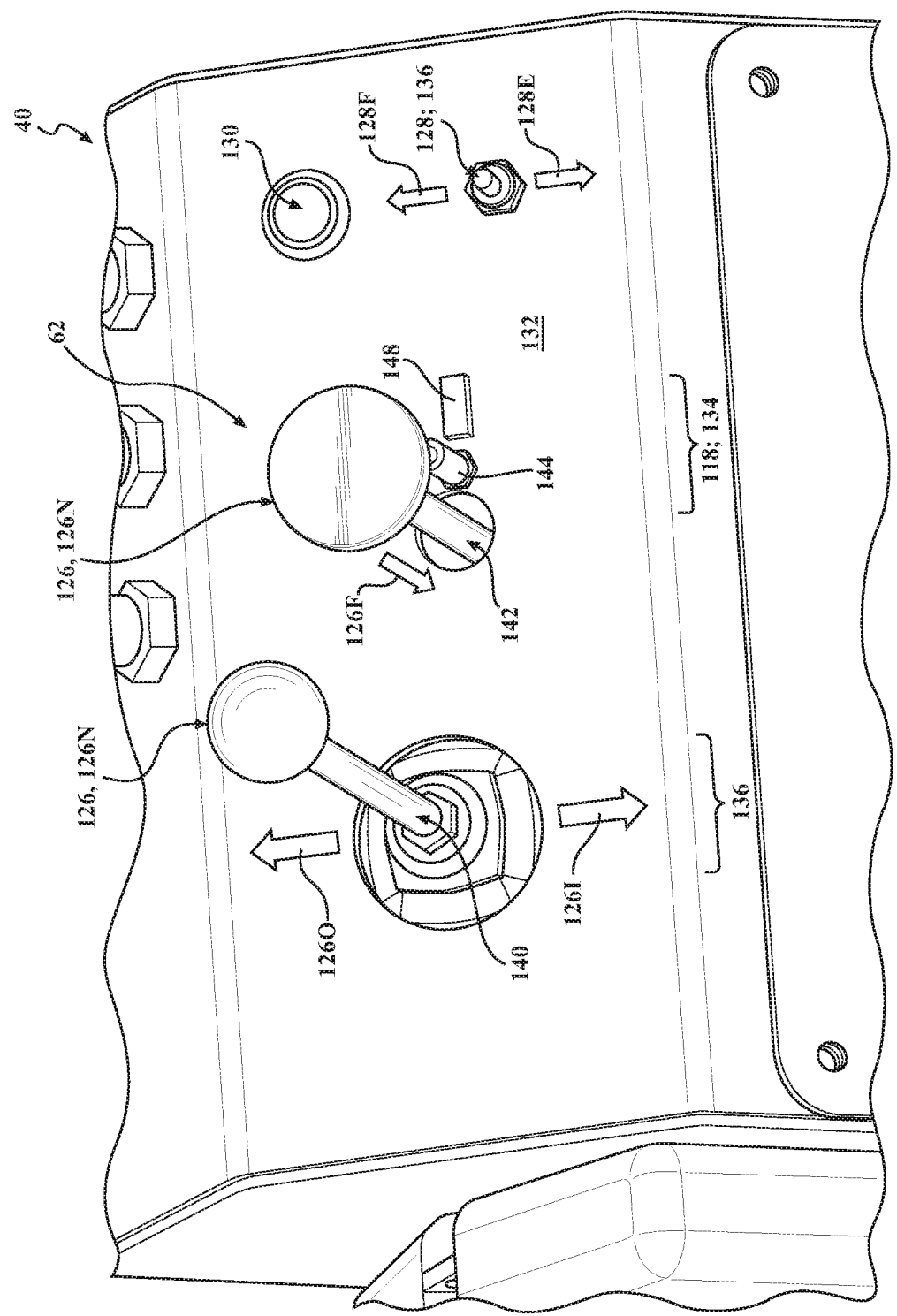

WASTE PROCESSING MACHINE FEED ASSIST SYSTEM

CROSS-REFERENCE TO RELATED APPLICATIONS

The subject patent application claims priority to and all the benefits of U.S. Provisional Patent Application Ser. No. 62/318,979 which was filed on Apr. 6, 2016, and U.S. Provisional Patent Application Ser. No. 62/319,006 which was filed on Apr. 6, 2016, the disclosures of which are hereby incorporated by reference.

BACKGROUND OF THE INVENTION

1. Field of the Invention

The present invention relates, generally, to waste processing machines and, more specifically, to a waste processing machine having a winch docking safety system.

2. Description of the Related Art

Conventional waste processing machines are employed to recycle, reduce, or otherwise process waste products or materials, such as bulk wood products, by chipping, cutting, grinding, or otherwise reducing the waste products. To this end, waste processing machines employ an infeed system to receive material to be reduced, such as wood products or tree limbs. A feed system with rotating feed wheels is employed to advance bulk material directed into the infeed system towards a cutting assembly. The cutting assembly, in turn, comprises a rotating disc or drum which is configured to reduce the bulk materials into chips. The chips are subsequently propelled out of a discharge chute arranged downstream of the cutting assembly.

In certain applications, the waste processing machine employs a winch assembly to help gather, secure, drag, lift, etc., the bulk products onto and into the infeed system for capture by the feed system of the waste processing machine. To this end, the winch assembly comprises a winch line and a winch driver to drag heavy bulk materials towards the infeed system.

Waste processing machines, and wood chippers in particular, are regularly utilized in a number of different industries. Those having ordinary skill in the art will appreciate that incorrect operation of waste processing machines can be potentially dangerous. Specifically, it will be appreciated that if proper procedures are not followed, it is possible for the winch line to be captured by the feed wheels of the feed system and/or by the disk or drum of the cutting assembly. Once captured, the winch line become entangled with or captured by the rotating disc or drum and consequently may be retracted. This retraction of the winch line may be too quick for an operator to react to and may cause safety issues. For example, retraction of the winch line can cause the winch line, and anything attached thereto, to be flung or whipped around, possibly causing damage or injury to nearby objects or operators. Further, if anything becomes entangled in the winch line, it may be pulled towards the waste processing machine.

Accordingly, while conventional waste processing machines have generally performed well for their intended use, there remains a need in the art for waste processing machines which are, among other things, relatively inexpensive to manufacture and operate, and which provide for increased safety and reliability when used in connection with winch lines.

SUMMARY OF THE INVENTION

The present invention overcomes the disadvantages in the prior art in a waste processing machine for reducing waste material and having a feed assist system. A frame is provided, and a cutting assembly is disposed on the frame for reducing waste material. A feed system is disposed on the frame for directing waste material toward the cutting assembly. A winch assembly is provided for selectively directing waste material toward the feed system. The winch assembly includes a winch line extending to a distal line end for securing waste material, and a winch driver coupled to the frame and in communication with the winch line to urge the line end toward the winch driver. A keeper is fixedly coupled to the frame to secure the line end to the frame. A winch docking safety system comprising a docking sensor is provided. The docking sensor is arranged to detect utilization of the winch assembly between a docked configuration and an undocked configuration. In the docked configuration, the winch line is tensioned between the winch driver and the line end, and the line end is secured to the keeper. In the undocked configuration, the winch line is loosened between the winch driver and the line end. A control unit is provided in communication with the feed system and the docking sensor to allow operation of the feed system when the winch assembly is in the docked configuration, and to interrupt operation of the feed system when the winch assembly is in the undocked configuration. A feed assist mechanism is provided in communication with the control unit and is arranged for actuation to selectively bypass the interrupted operation of the feed system when the winch assembly is in the undocked configuration to allow the feed system to advance waste material toward the cutting assembly for a predetermined bypass period. A limit mechanism is provided in communication with the control unit to override operation of the feed assist mechanism for a predetermined limit period following the bypass period.

In this way, the waste processing machine feed assist system of the present invention affords opportunities for improved safety by preventing winch lines from inadvertently being captured by the feed system and/or cutting assembly that might otherwise pull objects towards the waste processing machine. The waste processing machine feed assist system also affords significant advantages concerning usability, functionality, and operation of waste processing machines by allowing operators limited use of the feed system together with the winch assembly to advance large waste materials into the feed system and towards the cutting assembly.

BRIEF DESCRIPTION OF THE DRAWINGS

Advantages of the present invention will be readily appreciated as the same becomes better understood after reading the subsequent description taken in connection with the accompanying drawings.

FIG. 2A is a partial perspective view of the waste processing machine of FIGS. 1A-1B shown with the winch docking safety system in a docked configuration with a winch line secured to a keeper and tensioned against a hanger of a docking subassembly and with the hanger shown in a docked position.

FIG. 8A is a partial perspective view of one embodiment of a user interface for operating the feed assist system of FIGS. 1A-1B.

FIG. 8B is a partial perspective view of another embodiment of a user interface for operating the feed assist system of FIGS. 1A-1B.

DETAILED DESCRIPTION OF THE INVENTION

Figure 1A:
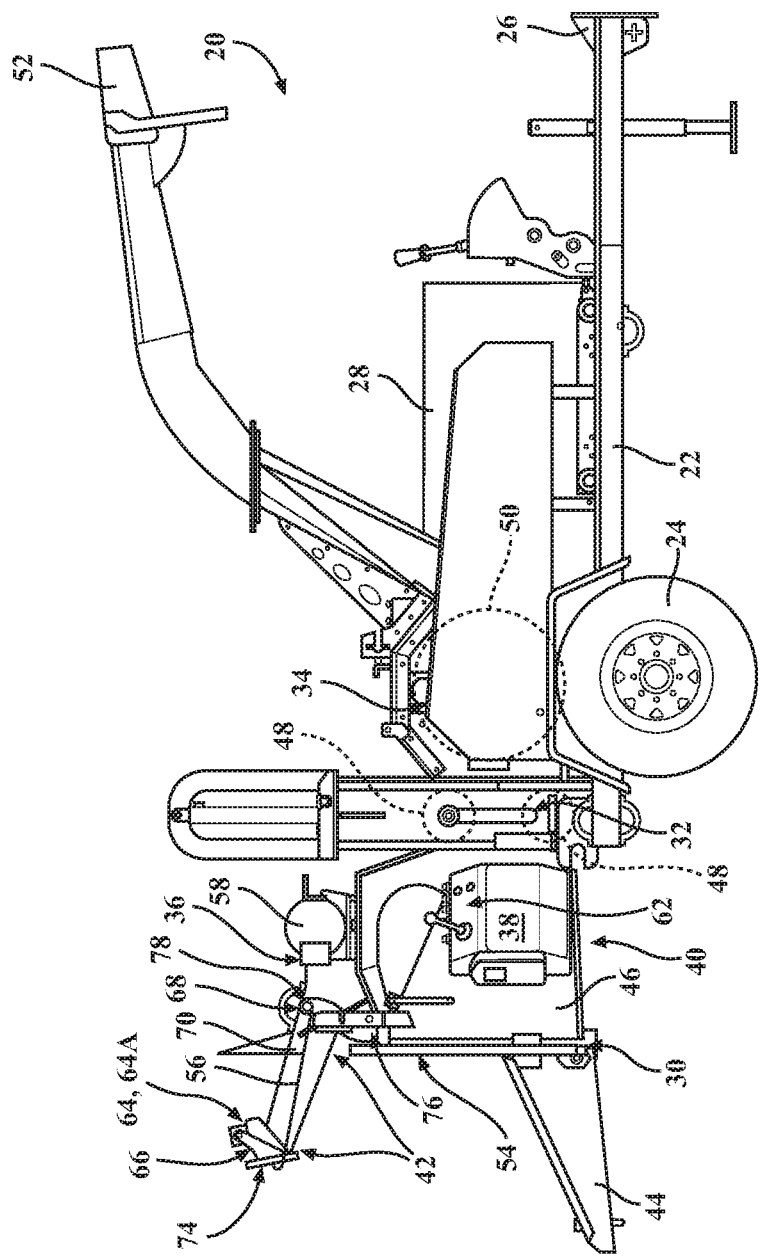
FIG. 1A is a side view of a waste processing machine having a feed assist system and a winch docking safety system according to embodiments of the present invention.
Figure 1B:
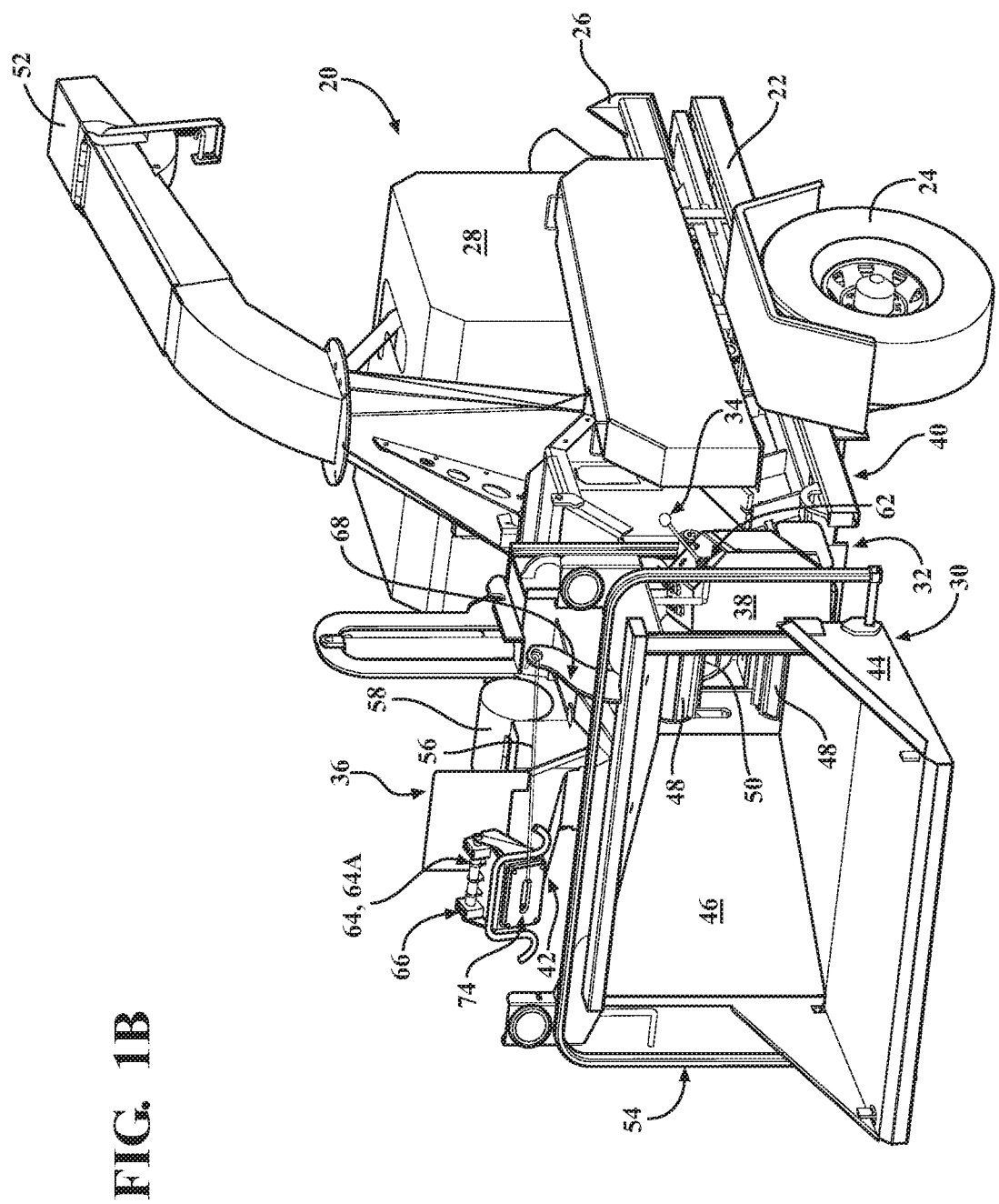
FIG. 1B is a perspective view of the waste processing machine of FIG. 1A.

With reference to the Figures, where like numerals are used to designate like structure throughout the several views, a waste processing machine according to one embodiment of the present invention is depicted at 20 in FIGS. 1A-1B. The waste processing machine 20 recycles, reduces, or otherwise processes products, such as bulk wood products, by chipping, cutting, grinding, or otherwise reducing the waste products. In the representative embodiment illustrated herein, the waste processing machine 20 is realized as a wood chipper. However, those having ordinary skill in the art will appreciate that the waste processing machine 20 could be of any suitable type or configuration sufficient to chip, grind, cut, or otherwise reduce bulk products or materials, without departing from the scope of the present invention.

Conventional waste processing machines 20, and wood chippers in particular, are regularly utilized in various industries. Those having ordinary skill in the art will appreciate that incorrect operation of waste processing machines 20 can be potentially dangerous. Accordingly, while conventional waste processing machines 20 have generally performed well for their intended use, there remains a need in the art waste processing machines 20 which are, among other things, relatively inexpensive to manufacture and operate, which provide for increased safety and reliability, and which are easily, automatically, and/or passively operable.

As noted above, the waste processing machine 20 depicted in FIGS. 1A-1B is realized as a mobile wood chipper with a frame 22 supported by a pair of wheels 24. A conventional trailer hitch 26 operatively attached to the frame 22 allows the waste processing machine 20 to be towed by a vehicle (not shown). The frame 22 generally supports a power source 28, an infeed system 30, a feed system 32, a cutting assembly 34, a winch assembly 36, a control unit 38, a feed assist system 40, and a winch docking safety system 42. Each of these components, systems, and assemblies will be described in greater detail below.

As noted above, the waste processing machine 20 depicted in FIGS. 1A-1B is configured so as to be transportable, such as by a vehicle. However, those having ordinary skill in the art will appreciate that the waste processing machine 20 could be configured in a number of different ways without departing from the scope of the present invention. By way of non-limiting example, the waste processing machine 20 could be stationary, could be implemented onto a vehicle, or could be supported on or otherwise moveable along a track.

The power source 28 is configured to provide a source of rotational torque which is used to drive the feed system 32 and the cutting assembly 34. To this end, the power source 28 may be realized as one or more internal combustion engines configured to translate rotational torque to certain components or systems of the waste processing machine 20, such as to the cutting assembly 34 and also to a hydraulic pump assembly which, in turn, may be used to drive certain components or systems, such as the winch assembly 36 (hydraulic system not shown in detail). It will be appreciated that the power source 28 could be arranged or otherwise configured in any suitable way without departing from the scope of the present invention. By way of non-limiting example, the power source 28 could utilize or otherwise be realized by one or more electric motors, engines, generators, pump assemblies, hydraulic drives, and the like.

The infeed system 30 is employed to facilitate directing material, such as wood products or tree limbs, to the feed system 32 which, in turn, directs the material to the cutting assembly 34 to reduce the material. To this end, the infeed system 30 includes an infeed tray 44 and an infeed hopper 46 arranged to direct material into the feed system 32. Certain materials, such as relatively small branches or tree limbs, can be inserted directly into the infeed hopper 46 towards the feed system 32. Other materials, such as relatively larger branches or tree limbs, can be supported first on the infeed tray 44 and then inserted into the infeed hopper 46 and moved towards the feed system 32. As described in greater detail below, the winch assembly 36 is used to pull particularly large or heavy materials onto the infeed tray 44 and into the infeed hopper 46 under certain operating conditions.

The feed system 32 is interposed between the infeed system 30 and the cutting assembly 34 and employs one or more feed wheels 48 (depicted schematically in FIG. 1A) arranged to pull materials inserted into the infeed hopper 46 towards cutting assembly 34. Here, the cutting assembly 34 is arranged in communication with the feed system 32 and includes a rotor 50 (depicted schematically in FIG. 1A), such as a rotating disc or drum, configured to reduce materials into chips which are propelled out of a discharge chute 52 arranged downstream of the cutting assembly 34. The rotor 50 of the cutting assembly 34 can be in the form of a drum for drum-style chippers, or in the form of a disc for disc-style chippers. The Applicant has described one type of feed system 32 and cutting assembly 34 from a drum-style chipper in published U.S. patent application Ser. No. 14/233,869, the disclosure of which is hereby incorporated by reference. However, those having ordinary skill in the art will appreciate that the feed system 32 could be configured in any suitable way sufficient to direct materials towards the cutting assembly 34 without departing from the scope of the present invention. Similarly, it will be appreciated that the cutting assembly 34 could be configured in any suitable way sufficient to reduce materials from the feed system 32.

As noted above, the cutting assembly 34 is driven by the power source 28 which may be throttled or otherwise controlled so as to drive the rotor 50 of the cutting assembly 34 at a predetermined rotational speed. Here, a clutch, transmission, and/or geartrain may be interposed between the power source 28 and the cutting assembly 34 to modulate or interrupt torque translation therebetween (not shown, but generally known in the art). The feed system 32 is likewise driven by the power source 28 and is generally controlled independently of the cutting assembly 34 using hydraulics (not shown, but generally known in the art). In the representative embodiment illustrated herein, a control bar, generally indicated at 54, is employed to facilitate control of the feed system 32 whereby the operator can move the control bar 54 so as to effect rotation of the feed wheels 48 in predetermined ways, such as forward, stop, and reverse.

The rotor 50 of the cutting assembly 34 generally rotates at a relatively high velocity, and the feed wheels 48 of the feed system 32 generally rotate relatively slowly. In operation, and as is described in greater detail in connection with FIGS. 9A-9F, material directed into the infeed system 30 is captured between the opposed, rotating feed wheels 48 of the feed system 32 which direct, pull, or otherwise cause those materials to move towards the cutting assembly 34 where they encounter the rotor 50 of the cutting assembly 34 and are reduced into chips which are expelled through the discharge chute 52.

As noted above, the winch assembly 36 cooperates with the infeed system 30 to direct waste materials towards the feed system 32. To that end, the winch assembly 36 includes a winch line 56 which is tensioned using a winch driver, generally indicated at 58. The winch driver 58 is coupled to the frame 22 and is adapted for control by an operator of the waste processing machine 20. The winch line 56 extends from the winch driver 58 to a distal line end 60 (see also FIGS. 2A-2B). The line end 60 is provided for securing waste material, and the winch driver 58 is configured to urge the line end 60 towards the winch driver 58, and to allow the line end 60 to be selectively moved away from the winch driver 58. To this end, in one embodiment, the winch assembly 36 cooperates with a user interface 62 adapted for actuation by an operator to control the winch assembly 36. Here, the operator of the waste processing machine 20 can use the user interface 62 to control the winch assembly 36 to, for example, pull the line end 60 towards the waste processing machine 20 via the winch driver 58, "free spool" or otherwise release tension in the winch line 56, and the like. It will be appreciated that the user interface 62 may be disposed in communication with the control unit 38 and the feed assist system 40, and may comprise one or more levers, buttons, inputs, and the like adapted for actuation by an operator, as described in greater detail below.

The winch line 56 (sometimes referred to in the related art as a "cable," "rope," or "line") is generally used to gather, secure, drag, lift, etc., large or bulky materials onto the infeed tray 44 and into the infeed system 30 for capture by the feed system 32. As the winch assembly 36 is utilized, if proper procedures are not followed, it is possible for the line end 60 or another portion of the winch line 56 to be captured by one or more of the feed wheels 48 of the feed system 32 and/or by the rotor 50 of the cutting assembly 34, whereby the winch line 56 could become quickly entangled with or captured by the rotating rotor 50 of the cutting assembly 34 and consequently retracted into the cutting assembly 34. As such, retraction of the winch line 56 may be too quick for an operator to react to and may cause safety issues. For example, rapid retraction of the winch line 56 may cause the line end 60, and anything attached thereto, to be flung or whipped around, possibly causing damage or injury. Further, anything encompassed by or entangled with the winch line 56 could be pulled towards the waste processing machine 20 if the line end 60 and/or a portion of the winch line 56 were to be captured by the rotor 50.

As is described in greater detail below, the winch docking safety system 42 cooperates with the feed assist system 40 to ensure safe operation of the waste processing machine 20 and to prevent retraction of the winch line 56, as noted above. To these ends, the winch docking safety system 42 includes a docking sensor 64 which is arranged to detect utilization of the winch assembly 36 between a docked configuration 64A (see FIGS. 2A and 7) and an undocked configuration 64B (see FIGS. 2B and 6). In the docked configuration 64A, the winch line 56 is tensioned between the winch driver 58 and the line end 60, with the line end 60 secured to the keeper 68. In the undocked configuration 64B, the winch line is loosened between the winch driver 58 and the line end 60.

In the representative embodiment illustrated throughout the drawings, the winch docking safety system 42 also includes a docking subassembly, generally indicated at 66, and a keeper 68, which cooperate with the docking sensor 64 to determine utilization of the winch assembly 36 between the configurations 64A, 64B. The keeper 68 is fixedly coupled to the frame 22 and is provided to secure the line end 60 of the winch line 56. As is described in greater detail below in connection with FIGS. 6 and 7, the docking subassembly 66 is movable in response to engagement with the winch line 56 between: a docked position 66A corresponding to the docked configuration 64A (see FIG. 7); and an undocked position 66B corresponding to the undocked configuration 64B (see FIG. 6). In the docked position 66A, the winch line 56 is tensioned against the docking subassembly 66 between the winch driver 58 and the line end 60 with the line end 60 secured to the keeper 68 (see FIG. 2A). In the undocked position 66B, the winch line 56 is loosened against the docking subassembly 66 (see FIG. 2B; compare with FIG. 2A).

Figure 2B:
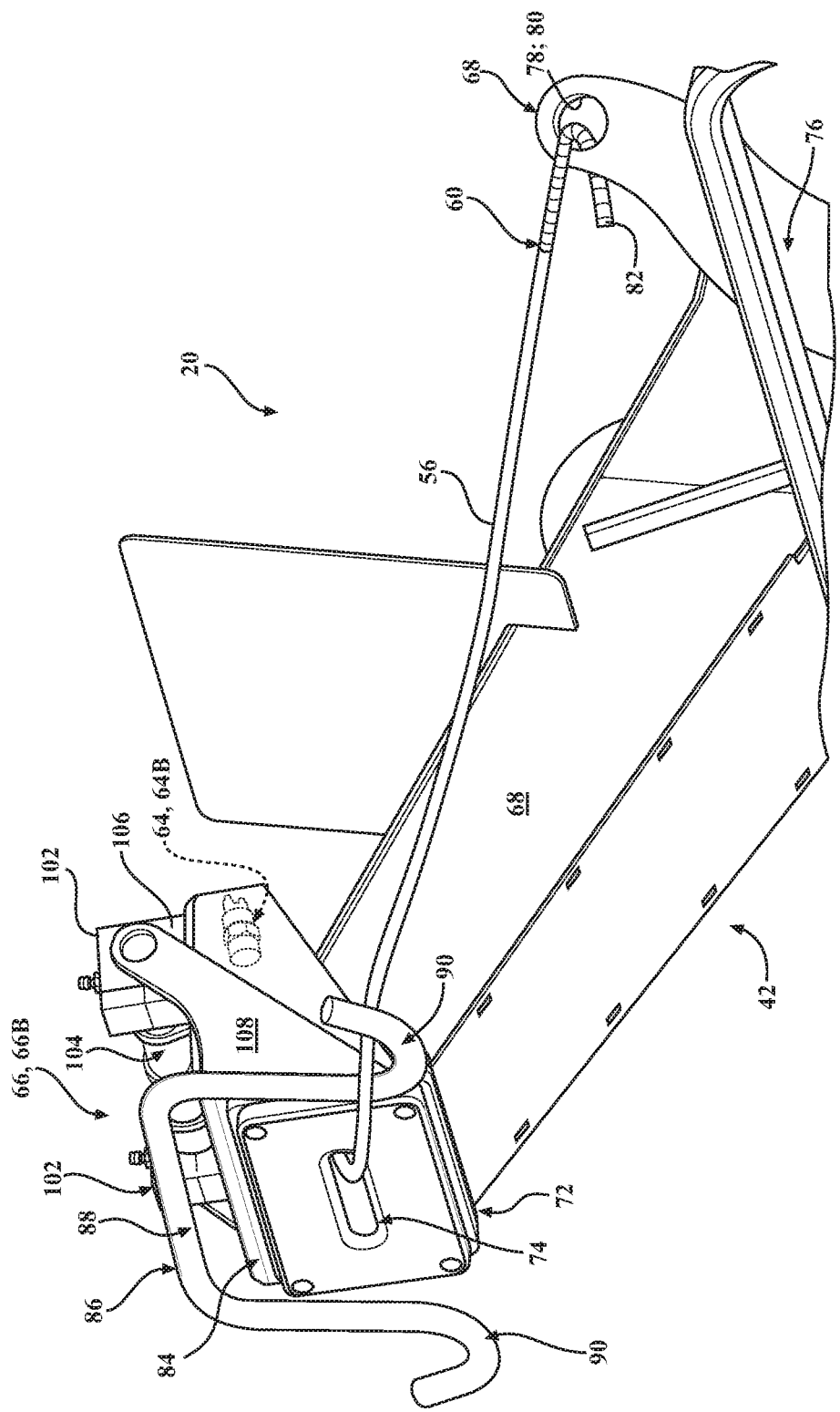
FIG. 2B is another partial perspective view of the waste processing machine and the winch docking safety system of FIGS. 1A-1B shown in an undocked configuration with the winch line loosened and with the hanger shown in an undocked position.

Those having ordinary skill in the art will appreciate that use of the terms "loose" and/or "loosened" herein can be used to describe any suitable configuration where the winch line 56 is not otherwise tensioned between the winch driver 58 and the keeper 68. By way of non-limiting example, while FIG. 2B depicts the winch line 56 loosened with the line end 60 secured to the keeper 68, the winch line 56 can also be considered to be loosened when the line end 60 is removed from the keeper 68.

As is described in greater detail below, the control unit 38 is in communication with the feed system 32 and the docking sensor 64 of the winch docking safety system 42. Here, the control unit 38 allows operation of the feed system 32 when the docking sensor 64 determines the winch assembly 36 is in the docked configuration 64A, and interrupts operation of the feed system 32 when the winch assembly 36 is in the undocked configuration 64B. Thus, the winch docking safety system 42 and the control unit 38 cooperate to limit, restrict, or otherwise prevent operation of the feed system 32 during certain utilization of the winch assembly 36, such as when the line end 60 is being used to direct materials to the infeed system 30. The docking subassembly 66, the keeper 68, and the control unit 38 will each be described in greater detail below.

As shown in FIGS. 1A-1B, the docking subassembly 66 is arranged vertically above the infeed tray 44 and is supported by a boom 70 which extends from the winch driver 58 to a boom end 72, and the docking subassembly 66 is operatively attached to the boom 70 adjacent to the boom end 72. Here, the winch line 56 extends from the winch driver 58, through the boom 70, through the docking subassembly 66, and out of a guide 74 operatively attached to the docking subassembly 66 which is configured to prevent the line end 60 from entering into the boom 70 (see FIGS. 2A-2B). In the representative embodiment illustrated herein, the guide 74 is employed as a fairlead and has a hawse configuration. However, those having ordinary skill in the art will appreciate that the guide 74 could be configured in any suitable way without departing from the scope of the present invention. By way of non-limiting example, the guide 74 could incorporate a roller assembly (not shown, but generally known in the art).

In the representative embodiment illustrated in FIGS. 1A-1B, the docking subassembly 66 is positioned longitudinally further away from the feed system 32 than the keeper 68 is. In addition, the keeper 68 is positioned vertically lower than the docking subassembly 66. This configuration helps to prevent the winch line 56 from engaging the docking subassembly 66 when the winch assembly 36 is being utilized and ensures that the winch line 56 properly engages the docking subassembly 66 when the line end 60 is secured to the keeper 68, as described in greater detail below. However, those having ordinary skill in the art will appreciate that the docking subassembly 66 could be positioned in any suitable location relative to the keeper 68 sufficient to effect movement from the undocked position 66B to the docked position 66A in response to engagement with the tensioned winch line 56 where the line end 60 is secured to the keeper 68, as noted above. By way of non-limiting example, the docking subassembly 66 could be operatively attached to another portion of the waste processing machine 20 besides the boom 70, such as to the infeed hopper 46. Moreover, while the keeper 68 is spaced from the docking subassembly 66 in the representative embodiments illustrated throughout the drawings, it is conceivable that a portion of docking subassembly 66 and/or the winch docking safety system 42 (for example, the docking sensor 64) could be coupled to the keeper 68. Furthermore, as will be appreciated from the subsequent description of the feed assist system 40 below, the winch docking safety system 42 could be configured in a number of different ways sufficient for the docking sensor 64 to detect utilization of the winch assembly 36 between the configurations 64A, 64B. Specifically, those having ordinary skill in the art will appreciate that the winch docking safety system 42 could omit a discrete docking subassembly 66 in some embodiments. Other arrangements are contemplated herein.

Referring now to FIGS. 2A-2B, as noted above, the keeper 68 of the winch docking safety system 42 is configured to releasably secure the line end 60 of the winch line 56. To this end, in one embodiment, the keeper 68 comprises a keeper mount 76 operatively attached to the frame 22, and a receiver 78 spaced from the keeper mount 76 to secure the line end 60 of the winch line 56. Those having ordinary skill in the art will appreciate that the keeper 68, the keeper mount 76, and the receiver 78 can be configured, shaped, or arranged in any suitable way sufficient to secure the line end 60 of the winch line 56. By way of non-limiting example, the keeper mount 76 can be rigidly attached to the frame 22 via welding, fasteners, and the like. In the representative embodiment illustrated herein, the keeper mount 76 is welded to a portion of the infeed hopper 46 which, in turn, is rigidly fixed to the frame 22. Here, while the keeper 68 is depicted throughout the drawings as being formed as a discrete component, it will be appreciated that the keeper 68 could be formed integrally with another part of the waste processing machine 20 without departing from the scope of the present invention.

In the representative embodiment illustrated in FIGS. 2A-2B, the receiver 78 of the keeper 68 is realized as an aperture 80 which is formed in the keeper 68 and receives the line end 60 of the winch line 56. Here in this embodiment, a hook 82 is operatively attached to the line end 60 and is configured to engage in the aperture 80 of the keeper 68 so as to facilitate tensioning the winch line 56 against the docking subassembly 66 to move to the docked position 66A such that the docking sensor 64 determines that the winch assembly 36 is in the docked configuration 64A. However, those having ordinary skill in the art will appreciate that the line end 60 could be configured in a number of different ways sufficient to secure to the keeper 68, with or without the use of a hook 82, without departing from the scope of the present invention. By way of non-limiting example, the line end 60 could employ a loop and/or a "choker" with a chain and hook section (not shown, but generally known in the related art). Similarly, while the keeper 68 employs the aperture 80 to receive the hook 82, it will be appreciated that the keeper 68 could similarly be configured in any suitable way sufficient to engage the line end 60 of the winch line 56, without departing from the scope of the present invention. By way of non-limiting example, the keeper 68 could be provided with a keeper mount 76 that has a hook-shaped configuration to receive a line end 60 provided with a loop (not shown).

Figure 3:
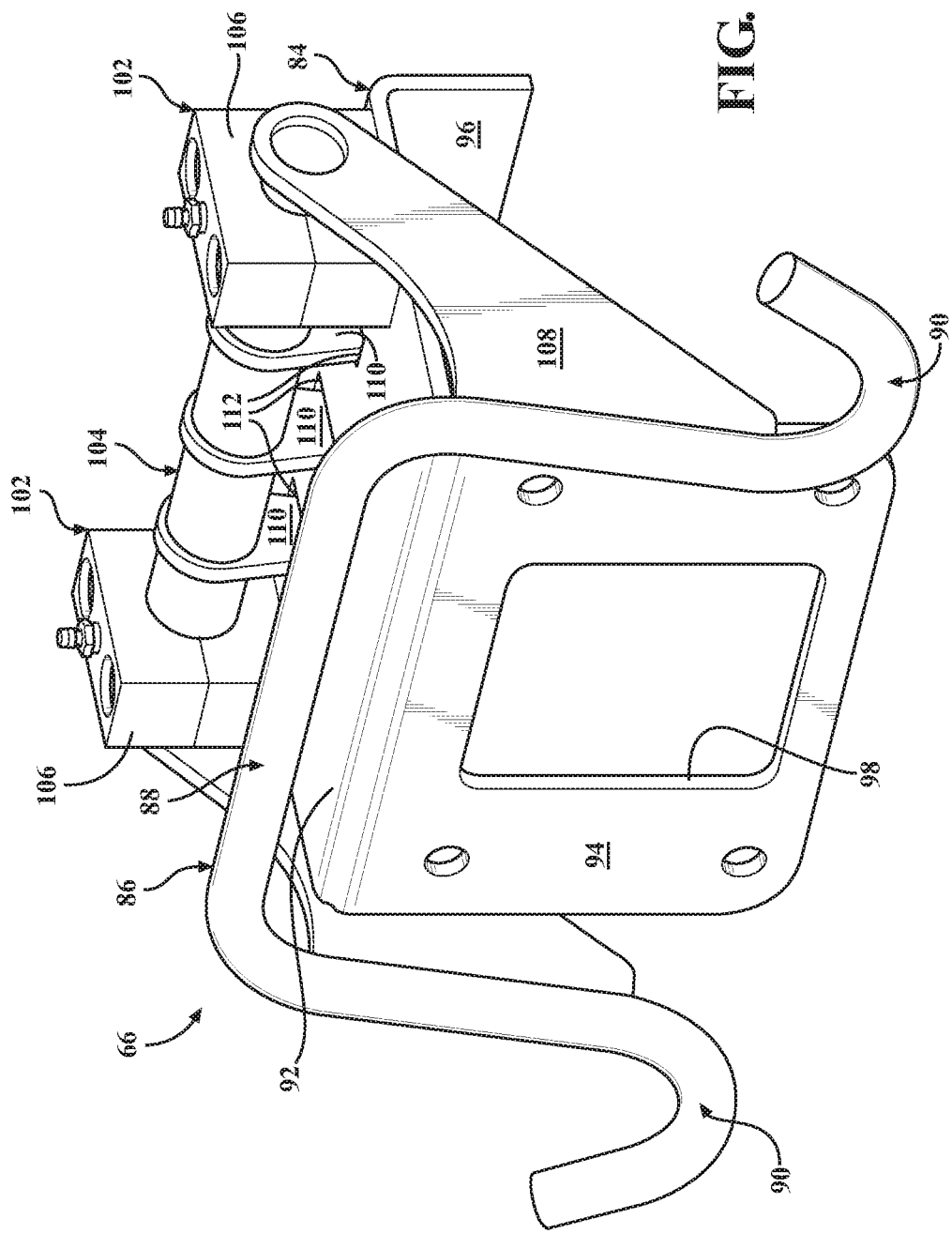
FIG. 3 is a perspective view of the docking subassembly of FIGS. 2A-2B.
Figure 6:
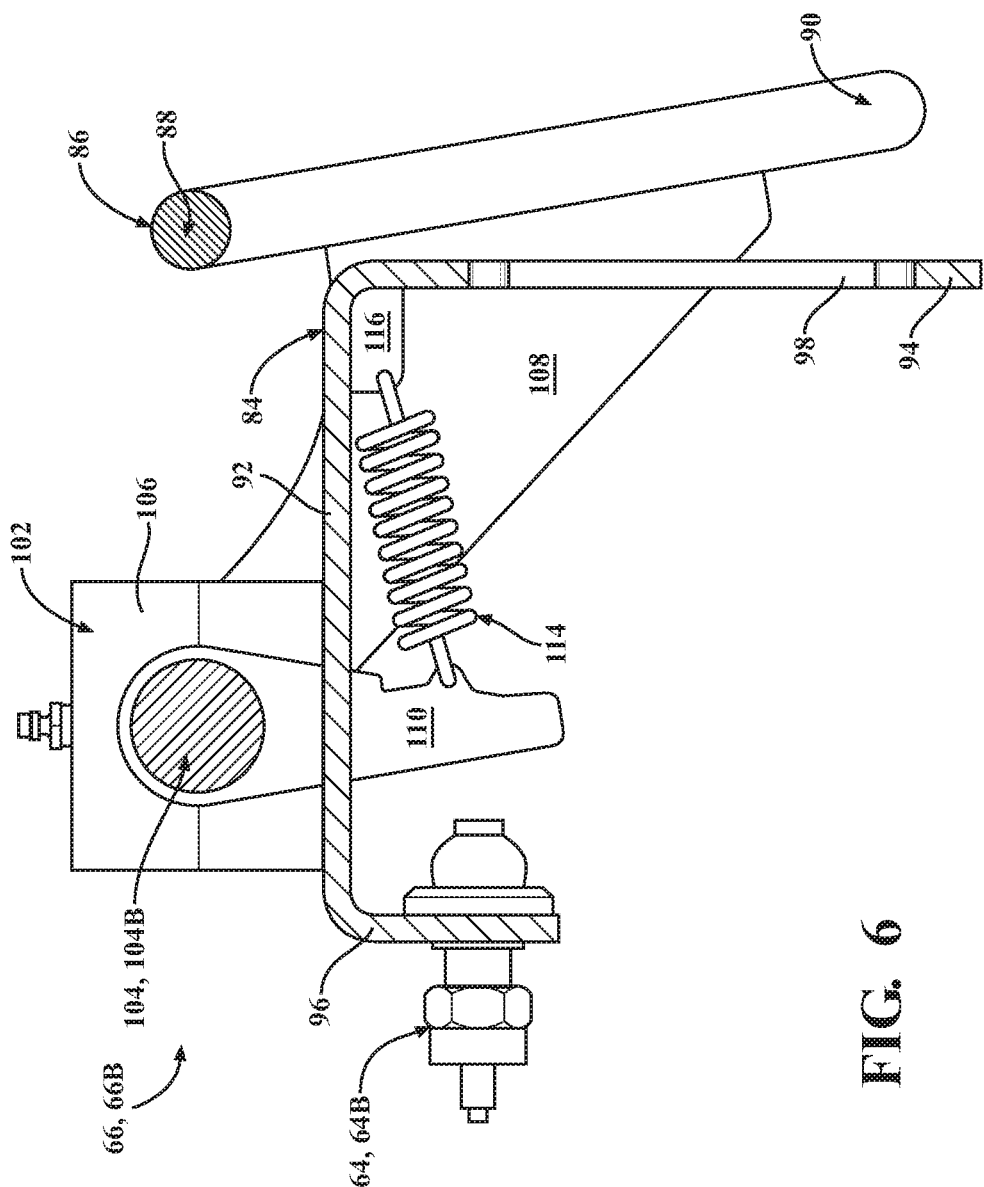
FIG. 6 is a sectional view taken along line 6-6 of FIG. 5 showing the docking subassembly in the undocked position depicted in FIG. 2B.

Referring now to FIGS. 2A-7, in one embodiment, the docking subassembly 66 of the winch docking safety system 42 includes a base 84 operatively attached to the frame 22, and a hanger 86 coupled to the base 84 and arranged for movement relative to the base 84 between the docked position 66A (see FIG. 7) and the undocked position 66B (see FIG. 6). As is best depicted in FIG. 2A, at least a portion of the winch line 56 engages against the hanger 86 when in the docked position 66A to allow the docking sensor 64 to determine that the winch assembly 36 is in the docked configuration 64A. As shown in FIG. 3, the hanger 86 has a generally U-shaped central portion 88 and a pair of generally C-shaped catch portions 90. The catch portions 90 are each shaped to receive the winch line 56 in the docked position 66A (see FIG. 2A). Those having ordinary skill in the art will appreciate that the hanger 86 could be configured with a single catch portion 90. In the representative embodiment illustrated herein, the hanger 86 is formed a unitary, one-piece component with a cylindrical cross-sectional profile which is formed (for example, by bending) so as to define the central portion 88 and the catch portions 90. However, those having ordinary skill in the art will appreciate that the hanger 86 could be of any suitable shape, configuration, or orientation sufficient to engage the winch line 56 in the docked position 66A.

Figure 7:
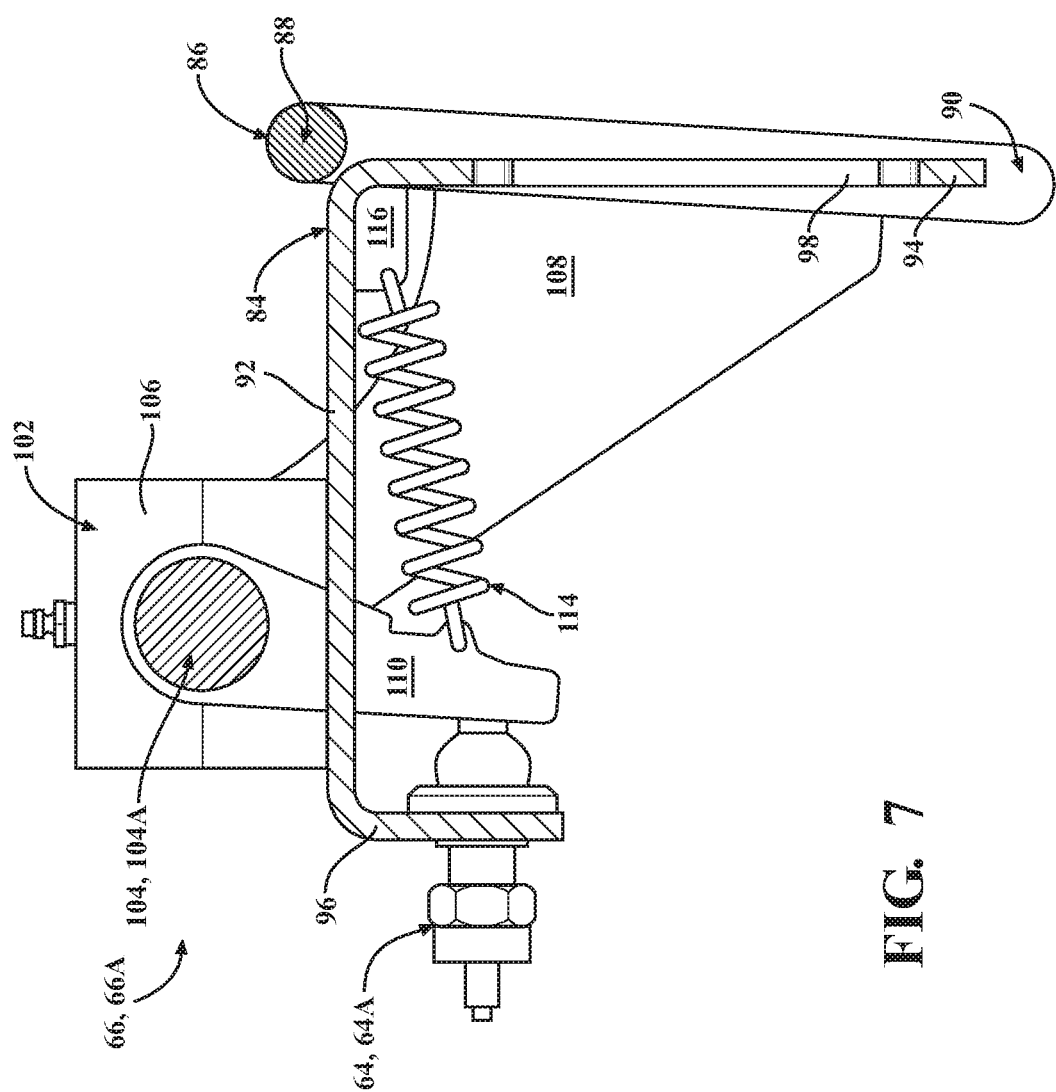
FIG. 7 is an alternate cross-sectional view of the docking subassembly depicted in FIG. 6 showing the docking subassembly in the docked position depicted in FIG. 2A.

The base 84 of the docking subassembly 66 is configured to secure to the waste processing machine 20, such as to the boom end 72 of the boom 70, and has a generally U-shaped profile defined by a base plate 92 from which a guide plate 94 and a sensor plate 96 extend (see FIGS. 3, 6, and 7). The guide plate 94 has a passage 98 defined therein through which the winch line 56 passes adjacent to the guide 74 (see FIGS. 2A-2B). The sensor plate 96 has a sensor hole 100 defined therethrough for receiving the docking sensor 64 which, as noted above, determines utilization of the winch assembly 36 between the configurations 64A, 64B in response to movement of the docking subassembly 66 between the positions 66A, 66B.

In one embodiment, the docking subassembly 66 includes a bearing assembly, generally indicated at 102, and a shaft 104 which is rotatably supported by the bearing assembly 102. Here, the shaft 104 is coupled to the hanger 86 such that movement of the hanger 86 between the docked position 66A and the undocked position 66B causes corresponding rotation of the shaft 104 between a docked radial position 104A (see FIG. 7) and an undocked radial position 104B (see FIG. 6). To this end, in one embodiment, the bearing assembly 102 comprises a pair of bearing blocks 106 which cooperate to rotatably support the shaft 104 for rotation between the radial positions 104A, 104B. As is best depicted in FIG. 3, the bearing blocks 106 are operatively attached to the base plate 92 adjacent to the sensor plate 96.

Referring now to FIGS. 3-7, in one embodiment, the docking subassembly 66 comprises at least one arm 108 extending between the shaft 104 and the hanger 86. Here, a pair of arms 108 are provided at opposing ends of the shaft 104 and each connects to the hanger 86 on opposing sides of the U-shaped central portion 88. The arms 108 are shaped so as to help position the hanger 86 relative to the shaft 104 and provide mechanical advantage while translating movement of the hanger 86 between the positions 66A, 66B into rotation of the shaft 104 between the radial positions 104A, 104B. In the representative embodiment illustrated herein, the docking subassembly 66 also comprises at least one cam member 110 fixed to the shaft 104 for concurrent movement between the radial positions 104A, 104B as the docking subassembly 66 moves between the positions 66A, 66B.

Figure 4:
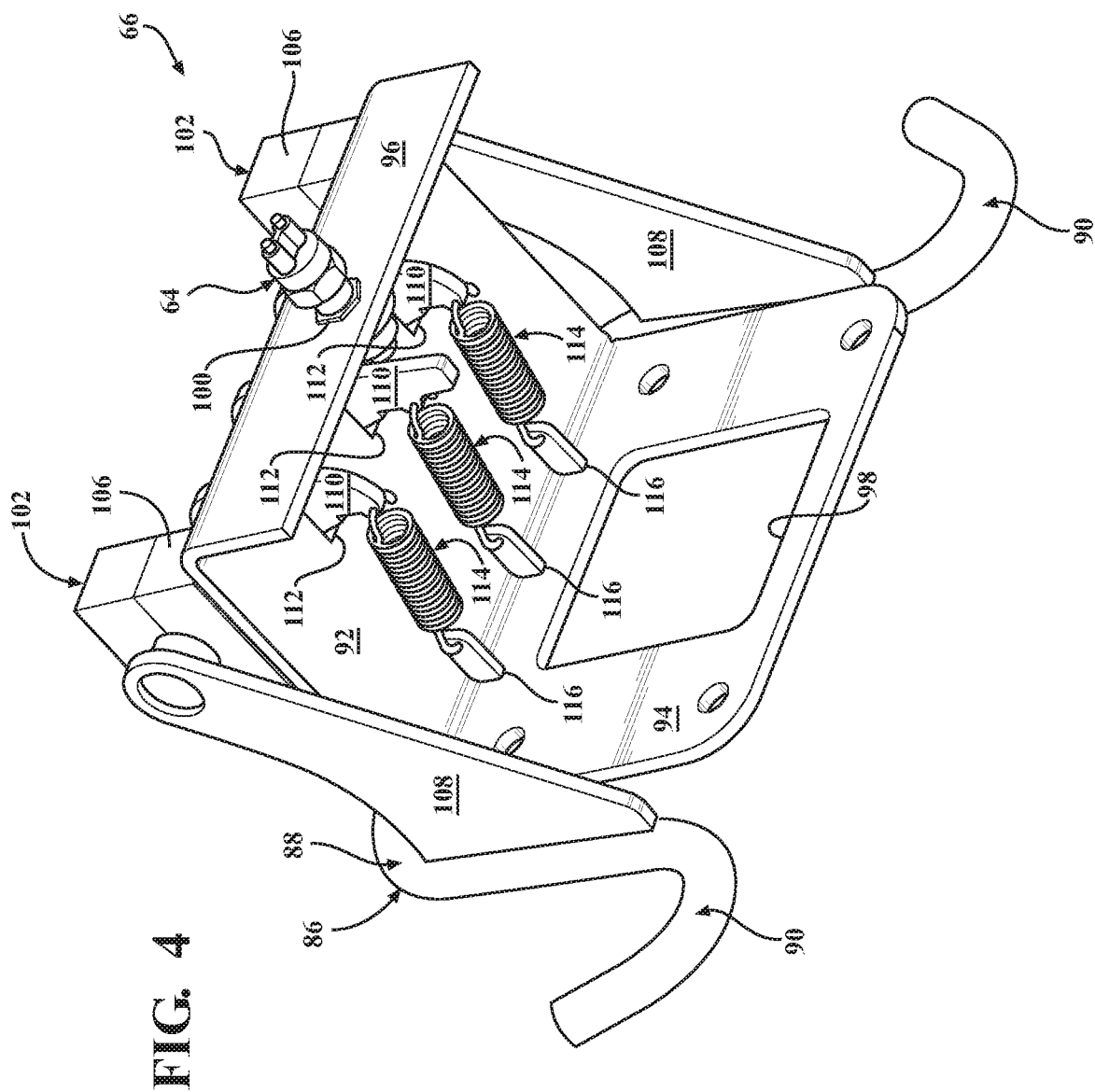
FIG. 4 is a rotated perspective view of the docking subassembly of FIG. 3.
Figure 5:
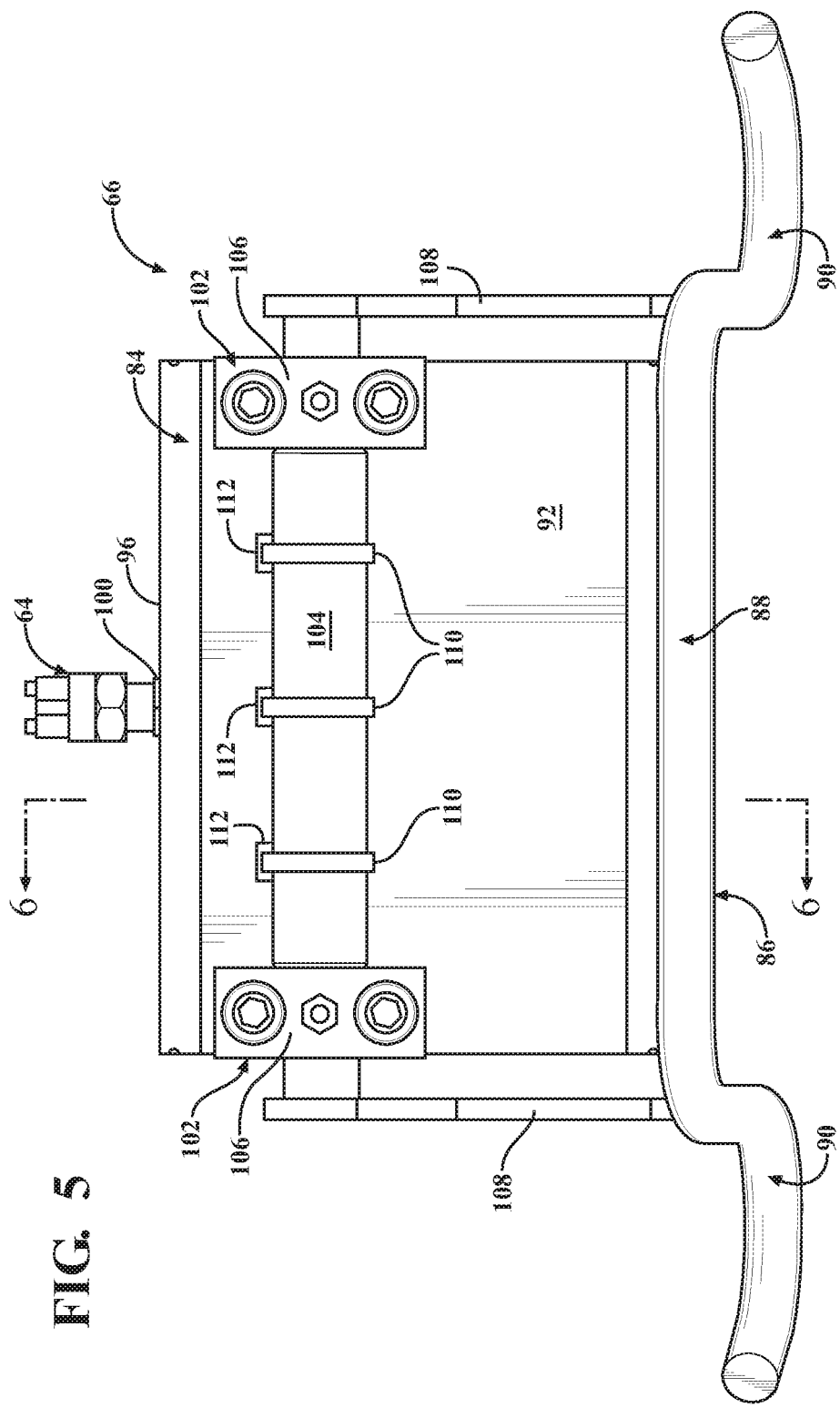
FIG. 5 is a top view of the docking subassembly of FIGS. 3 and 4.

As shown in FIG. 4, three cam members 110 are attached to the shaft 104 and are disposed in spaced relation between the arms 108. The cam members 110 each pass through respective slots 112 defined in the base plate 92 of the base 84 adjacent to the sensor plate 96, with one of the cam members 110 being arranged so as to engage the docking sensor 64, in the docked radial position 104A (see FIG. 7), as explained in greater detail below. In the illustrated embodiment, the docking subassembly 66 further comprises a biasing element 114 interposed between the base 84 and at least one of the cam members 110 to urge the shaft 104 away from the docked radial position 104A (see FIG. 7) and toward the undocked radial position 104B (see FIG. 6). This configuration helps ensure that the control unit 38 is able to interrupt operation of the feed system 32 as soon as the docking subassembly 66 moves from the docked position 66A to the undocked position 66B and, thus, allows the docking sensor 64 of the winch docking safety system 42 to quickly and accurately determine changes in utilization of the winch assembly 36 between the docked configuration 64A and the undocked configuration 64B.

As is best shown in FIG. 4, in the representative embodiment illustrated herein, three biasing elements 114 realized as extension springs are provided; one attached to each of the respective three cam members 110 and also to a respective spring mount 116 fixed to the base 84 adjacent to the guide plate 94. However, those having ordinary skill in the art will appreciate that the winch docking safety system 42 can include any suitable number of biasing elements 114, of any suitable type, configuration, or arrangement sufficient to urge the docking subassembly 66 toward the undocked position 66B, without departing from the scope of the present invention.

The biasing elements 114 urge the cam members 110 towards the guide plate 94 of the base 84 and away from the docking sensor 64 when the winch assembly 36 is being utilized. Here, when the winch line 56 is out of engagement with the hanger 86 of the docking subassembly 66 while in the undocked position 66B, the docking sensor 64 remains spaced from the cam members 110 (see FIG. 6) and, thus, determines utilization of the winch assembly 36 in the undocked configuration 64B. Conversely, when the winch line 56 engages against the hanger 86 of the docking subassembly 66 while in the docked position 66A, the docking sensor 64 comes into engagement with one of the cam members 110 (see FIG. 7) and, thus determines utilization of the winch assembly 36 in the docked configuration 64A. In some embodiments, the biasing elements 114 are configured and arranged to exert enough force to ensure that the docking subassembly 66 cannot be manually bypassed, such as by an operator pushing on the hanger 86 to move the cam member 110 into engagement with the docking sensor 64. Likewise, the docking sensor 64 can advantageously be shielded or otherwise positioned so as to inhibit access by an operator.

In the representative embodiment illustrated herein, the docking sensor 64 of the winch docking safety system 42 comprises a limit switch disposed in electrical communication with the control unit 38 which determines utilization of the winch assembly 36 between the configurations 64A, 64B by detecting movement of the docking subassembly 66 between the positions 66A, 66B based on physical contact with one of the cam members 110. However, those having ordinary skill in the art will appreciate that the docking sensor 64 could be of any suitable type or configuration sufficient to differentiate utilization of the winch assembly 36 between the docked configuration 64A and the undocked configuration 64B. By way of non-limiting example, the docking sensor 64 could be a proximity sensor or switch, a hall-effect sensor, a rotary encoder disposed in communication with the shaft 104, and the like.

As noted above, the control unit 38 is disposed in communication with the feed system 32 and the docking subassembly 66 and is configured to allow operation of the feed system 32 when the winch assembly 36 is in the docked configuration 64A, and to at least partially limit operation of the feed system 32 in the undocked configuration 64B. To these ends, it will be appreciated that the control unit 38 can be configured in a number of different ways, and from a number of different types and arrangements of components, depending on application requirements and the specific configuration of the waste processing machine 20.

By way of non-limiting example, where the waste processing machine 20 employs hydraulic fluid pressure to operate the feed system 32 and/or the winch driver 58, the control unit 38 could comprise an arrangement of hydraulic valves, solenoids, switches, and the like which cooperate to detect utilization of the winch assembly 36 in the undocked configuration 64B and at least partially limit operation of the feed system 32 in response. Specifically, it is conceivable that the docking sensor 64 could be implemented as a physically-actuated hydraulic valve configured to alter fluid flow to a hydraulic drive employed to rotate the feed wheels 48 of the feed system 32 (not shown). Thus, it will be appreciated that communication between the control unit 38, the feed system 32, the winch assembly 36, the docking subassembly 66, and/or the feed assist system 40 can be at least partially defined by hydraulic communication, based such as on fluid flow, pressure, volume, temperature, and the like.

By way of further non-limiting example, the control unit 38 could also comprise various electrical components, such as microcontrollers, electronic switches, sensors, engine controllers (for example, to communicate with the power source 28), and the like which cooperate to detect utilization of the winch assembly 36 in the undocked configuration 64B and at least partially limit operation of the feed system 32 in response. Specifically, it is conceivable that the docking sensor 64 could be implemented as a physically-actuated electronic switch configured to generate a signal communicated to a microcontroller which, in turn, is configured to drive an electrically-actuated hydraulic solenoid to alter fluid flow to a hydraulic drive employed to rotate the feed wheels 48 of the feed system 32 (not shown). Thus, it will be appreciated that communication between the control unit 38, the feed system 32, the winch assembly 36, the docking subassembly 66, and/or the feed assist system 40 can be at least partially defined by electrical communication, based such as on voltage, current, resistance, impedance, signal generation, sensor data, and the like.

Those having ordinary skill in the art will appreciate that the control unit 38, and/or one or more components of the feed assist system 40 (described in greater detail below) may include or otherwise may be realized by any suitable number of electrical, mechanical, or hydraulic systems or components which cooperate to limit operation of the feed system 32 when the docking sensor 64 determines utilization of the winch assembly 36 in the undocked configuration 64B.

In some embodiments, the cutting assembly 34 is configured to operate when the winch assembly 36 is in the docked configuration 64A and also when in the undocked configuration 64B. This arrangement allows the operator to resume processing waste materials as soon as the docking subassembly 66 returns to the docked position 66A with the winch line 56 tensioned and with the line end 60 secured to the keeper 68. However, it is conceivable that the control unit 38 could also be configured to limit, prevent, or otherwise interrupt operation of the cutting assembly 34 when in the undocked position 66B.

It will be appreciated that the orientation of and the relative positioning between the docking subassembly 66 and the keeper 68 may be adjusted to accommodate differently configured waste processing machines 20. As noted above, and as is depicted in FIGS. 1A-2B, the keeper 68 is positioned vertically below and both longitudinally and laterally away from the docking subassembly 66. Specifically, the keeper 68 and the docking subassembly 66 are positioned and oriented so as to effect pivoting of the shaft 104 when the winch line 56 is tensioned against the hanger 86, as noted above, but not during conventional use of the winch assembly 36 whereby proper positioning of the line end 60 ensures that the winch line 56 exits the guide 74 and extends away from the infeed system 30 so as to pull materials towards the infeed system 30 from behind the waste processing machine 20.

It will be appreciated that it is disadvantageous for the feed system 32 to operate at full speed when the winch assembly 36 is being utilized and, as noted above, when the winch assembly 36 is used to pull material towards the infeed system 30, operation of the feed system 32 is interrupted until the winch docking safety system 42 determines, via the docking sensor 64, that the winch assembly 36 is in the docked configuration 64A with the line end 60 secured to the keeper 68 and with the winch line 56 tightened against the hanger 86 of the docking subassembly 66. However, those having ordinary skill in the art will appreciate that larger objects can be difficult to move into the feed system 32 from the infeed system 30. By way of non-limiting example, when the winch assembly 36 has been used to support a large object on the infeed tray 44, it can be difficult to push the large object into the infeed hopper 46 towards the feed wheels 48 of the feed system 32 by hand. Similarly, it can be difficult to position a large object into the infeed system 30 such that the feed wheels 48 receive the object and move the object towards the cutting assembly 34. In order to overcome these challenges in handling large objects, the feed assist system 40 of the present invention allows the operator to rotate the feed wheels 48 of the feed system 32 to "jog" or "creep" the feed wheels 48 onto waste materials, such as large logs, while the winch assembly 36 is utilized in the undocked configuration 64B.

Referring now to FIGS. 8A-10, as noted above, the feed assist system 40 cooperates with the winch docking safety system 42 to ensure that the line end 60 and/or winch line 56 are not retracted into the feed wheels 48 of the feed system 32 and subsequently into the rotor 50 of the cutting assembly 34. In addition, and as is described in greater detail below, the feed assist system 40 is configured to effect limited control of the feed system 32 under certain predetermined operating conditions of the winch assembly 36. To this end, and as is illustrated via the logic map depicted in FIG. 10, the feed assist system 40 includes a feed assist mechanism 118 and a limit mechanism 120 each disposed in communication with the control unit 38 (for example, via hydraulic or electrical communication). The feed assist mechanism 118 is arranged for actuation by an operator to selectively bypass the interrupted operation of the feed system 32 effected by the winch docking safety system 42 when the winch assembly 36 is in the undocked configuration 64B. The bypass afforded by the feed assist mechanism 118 allows the feed system 32 to be utilized to advance waste material toward the cutting assembly 34 for a predetermined bypass period 122. The limit mechanism 120 is configured to override operation of the feed assist mechanism 118 for a predetermined limit period 124 following the bypass period 122. Thus, as noted above, the feed assist mechanism 118 allows the operator to "jog" or "creep" the feed wheels 48 of the feed system 32 onto particularly large waste materials which have been directed into the infeed system 30 and which are supported, suspended, or otherwise being pulled with the winch assembly 36.

By configuring the bypass period 122 such that actuation of the feed assist mechanism 118 advances the feed system 32 only slightly (for example, rotation of the feed wheels 48 for less than one second or for less than 15 degrees of rotation) compared to normal operation (for example, constant rotation of the feed wheels 48), the feed assist system 40 of the present invention effectively prevents the winch line 56 from being inadvertently captured by the feed system 32. Moreover, because of the limit period 124 following the bypass period 122, the feed assist system 40 prevents the operator from successively bypassing the interrupted operation of the feed system 32 without pausing. Here, by forcing the operator to wait until the bypass period 122 has elapsed before recognizing actuation of the feed assist mechanism 118, the feed assist system 40 is able to further promote safe operation of the waste processing machine 30 while the winch assembly 36 is utilized in the undocked configuration 64B. The feed assist system 40, the feed assist mechanism 118, the limit mechanism 120, the bypass period 122, and the limit period 124 will each be described in greater detail below.

Referring now to FIGS. 8A-8B, two embodiments of the user interface 62 are depicted for operating the feed assist system 40 and the winch assembly 36. In each of these embodiments, the user interface 62 comprises a handle arrangement 126, a switch 128, and an indicator 130 supported in a panel, generally indicated at 132, which is positioned on a lateral side of the waste processing machine 20 spaced from the infeed hopper 46. Here, the operator can manipulate the handle arrangement 126 and the switch 128, and can observe the indicator 130, rotation of the feed wheels 48 of the feed system 32, and the relative position of the line end 60 of the winch line 56, as the feed assist system 40 is utilized.

In the representative embodiments illustrated herein, the handle arrangement 126 serves as a feed assist input 134 of the feed assist mechanism 118 which is disposed in communication with the control unit 38 (for example, via hydraulic or electrical communication) and which is arranged for momentary actuation from the operator to bypass the interrupted operation of the feed system 32, as noted above. As will be appreciated from the subsequent description below, the feed assist input 134 can be defined by any component, structure, or feature sufficient to actuate the feed assist mechanism 118. The handle arrangement 126 also serves as a winch input 136 of the winch assembly 36 which is arranged for actuation for the operator to control the winch assembly 36. Here too, the winch input 136 can be defined by any component, structure, or feature sufficient to drive the winch assembly 36.

The handle arrangements 126 and the switches 128 are realized as discrete input controls employed to facilitate control of the winch assembly 36 and the feed assist system 40 by the operator, as noted above, and each are selectively movable between different positions. Specifically, the handle arrangements 126 are each movable from a neutral position 126N to one of a winch out position 126O, a winch in position 126I, a feed wheels position 126F, and a feed wheels winch in position 126C; and the switch 128 is movable between a winch engaged position 128E and a free spool position 128F. As is explained in greater detail below, movement of the handle arrangements 126 from the neutral position 126N to one of the other positions 126O, 126I, 126F, 126C effects control of the winch assembly 36 and/or the feed system 32 in predetermined ways corresponding to each respective position, and movement of the switches 128 between the positions 128E, 128F effects control of the winch assembly 36 in predetermined ways corresponding to each respective position. However, it will be appreciated that the feed assist system 40 could employ user interfaces 62 of any suitable type or configuration of sufficient to effect control of the winch assembly 36 and/or the feed assist system 40, without departing from the scope of the present invention.

In the embodiment illustrated in FIG. 8A, the handle arrangement 126 is realized with a single five-position hydraulic switch 138 movable from the neutral position 126N to one of the other four positions 126O, 126I, 126F, 126C noted above. In this embodiment, the five-position hydraulic switch 138 serves as both the feed assist input 134 and the winch input 136, and is employed to facilitate control of both the feed assist system 40 and the winch assembly 36. Specifically, the operator can move the five-position hydraulic switch 138 from the neutral position 126N to: the winch out position 126O to move the line end 60 away from the waste processing machine 20; the winch in position 126I to move the line end 60 towards the waste processing machine; the feed wheels position 126F to activate the feed assist mechanism 118 for the bypass period 122; or the feed wheels winch in position 126C to simultaneously activate the feed assist mechanism 118 for the bypass period 122 and move the line end 60 towards the waste processing machine 20.

In the embodiment illustrated in FIG. 8B, the handle arrangement 126 is realized with a three-position hydraulic switch 140 movable from the neutral position 126N to one of the winch out position 126O and the winch in position 126I, and also with a two-position hydraulic switch 142 movable from its own neutral position 126N to the feed wheels position 126F. In this embodiment, the three-position hydraulic switch 140 serves as the winch input 136, and the two-position hydraulic switch 142 serves as the feed assist input 134. Put differently, the three-position hydraulic switch 140 controls the winch assembly 36, and the two-position hydraulic switch 142 controls the feed assist system 40, and the operator can use the switches 140, 142 independently and/or simultaneously.

Other types and configurations of handle arrangements 126, feed assist inputs 134, and/or winch inputs 136 are contemplated herein. By way of non-limiting example, while hydraulic switches 138, 140, 142 are illustrated in FIGS. 8A-8B, the handle arrangement 126 could comprise various arrangements of mechanical, electrical, and/or hydraulic systems and components. Here too, additional components may be incorporated into the user interface 62 to facilitate different types of communication between the handle arrangement 126 and one or more of the winch assembly 36, the control unit 38, the feed assist system 40, and/or the winch docking safety system 42. By way of non-limiting example, in the embodiment illustrated in FIG. 8B, an electrical switch 144 is disposed adjacent to the two-position hydraulic switch 142 such that movement of the two-position hydraulic switch 142 to the feed wheels position 126F also activates the electrical switch 144. Put differently, in this embodiment, movement to the feed wheels position 126F can be communicated electrically as well as hydraulically. Other arrangements are contemplated herein.

With continued reference to FIGS. 8A-8B, as noted above, the operator is able to release tension in the winch line 56 by moving the switches 128 from the winch engaged position 128E to the free spool position 128F. Here, when movement of the switch 128 to the free spool position 128F causes the winch line 56 to loosen, the docking sensor 64 determines utilization of the winch assembly 36 in the undocked configuration 64B and the winch docking safety system 42 interrupts operation of the feed system 32, as noted above. While the switches 128 are depicted in FIGS. 8A-8B as electronic toggle switches, those having ordinary skill in the art will appreciate that the waste processing machine 20 could employ a number of different types of mechanisms sufficient to release tension in the winch line 56. By way of illustrative example, the winch assembly 36 could employ a clutch mechanism actuated by a mechanical linkage or a lever to release tension in the winch line 56 (not shown).

When the switch 128 is moved to the free spool position 128F and the winch assembly 36 releases tension in the winch line 56, the operator can subsequently remove the line end 60 from the keeper 68 and pull the winch line 56 away from the waste processing machine 20. The operator can then secure the line end 60 to material to be pulled towards the waste processing machine 20. Once the line end 60 is secured, the switch 128 can be moved back to the winch engaged position 128E, whereby the winch assembly 36 can subsequently be utilized via operation of the handle arrangement 126 as the winch input 136, as noted above.

With continued reference to FIGS. 8A-8B, the indicator 130 is configured to activate in response to the switch 128 being in the free spool position 128F so as to provide a visual alert to the operator. Here, the indicator 130 is realized as a light that is configured to illuminate when the switch 128 is in the free spool position 128F, and not to illuminate when the switch 128 is in the winch engaged position 128E. However, those having ordinary skill in the art will appreciate that the indicator 130 could be realized in a number of different ways, with or without the use of a light, without departing from the scope of the present invention. Moreover, while the indicator 130 is shown as being supported in the panel 132 adjacent to the switch 128, it will be appreciated that the indicator 130, or additional indicators 130, could be disposed in other locations, such as adjacent to the docking subassembly 66 (not shown).

Figure 9A:
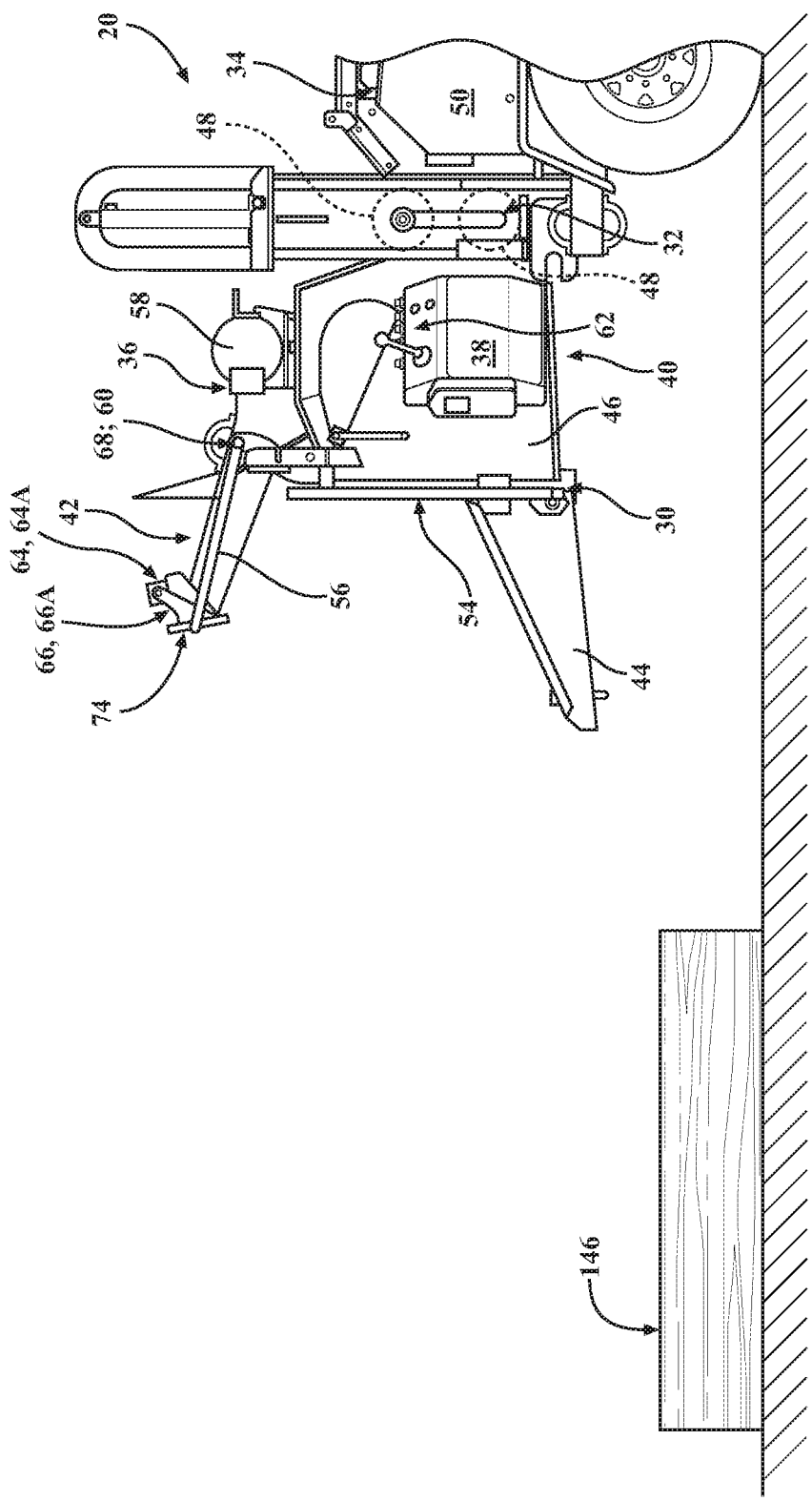
FIG. 9A is a first partial side view of the waste processing machine of FIGS. 1A-2B shown adjacent to a log, and with the winch line secured to the keeper of the winch docking safety system.
Figure 9B:
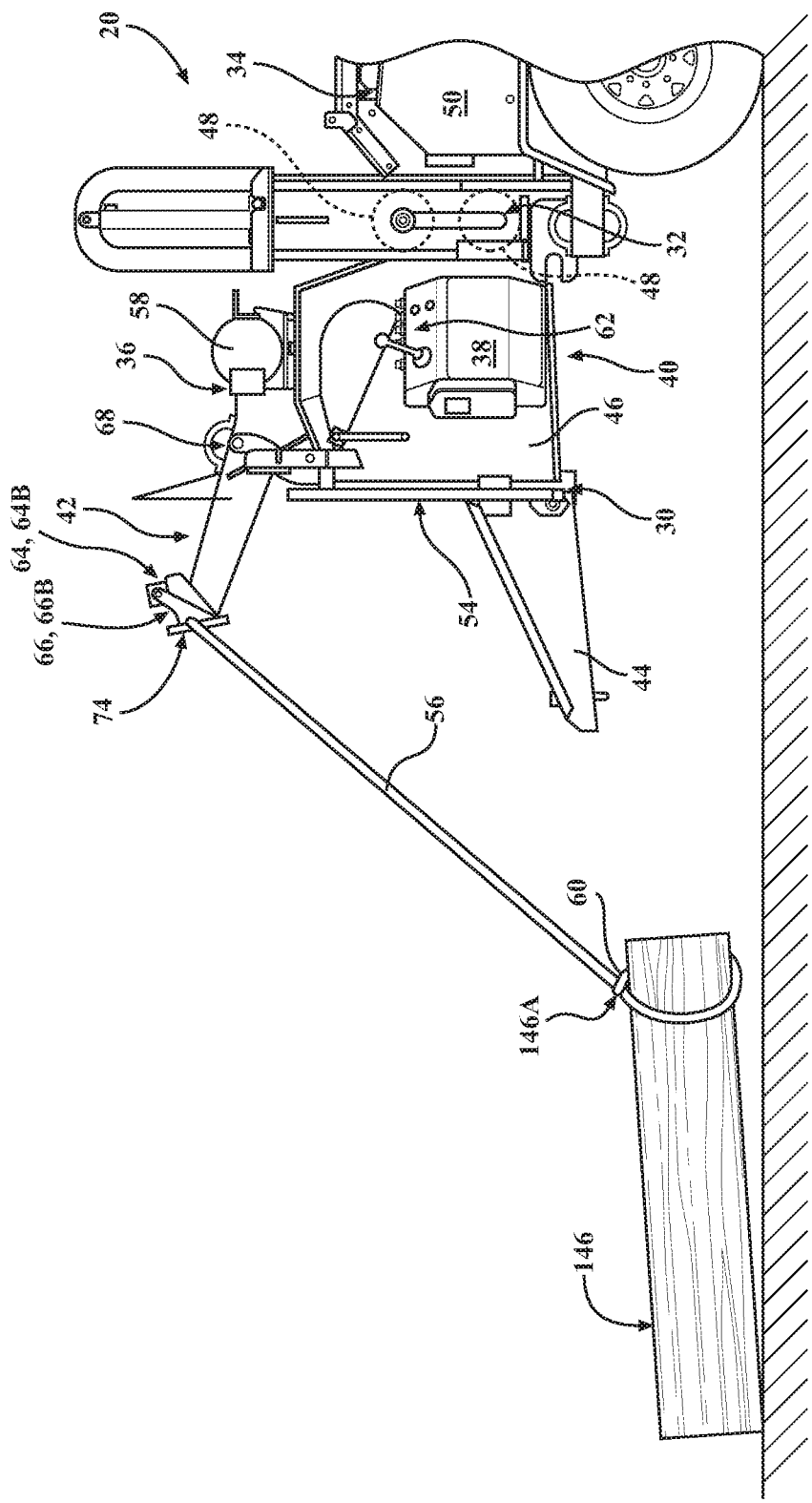
FIG. 9B is a second partial side view of the waste processing machine depicted in FIG. 9A shown with the winch line secured to the log at a first position, the log being directed towards an infeed system of the waste processing machine via the feed assist system.
Figure 9C:
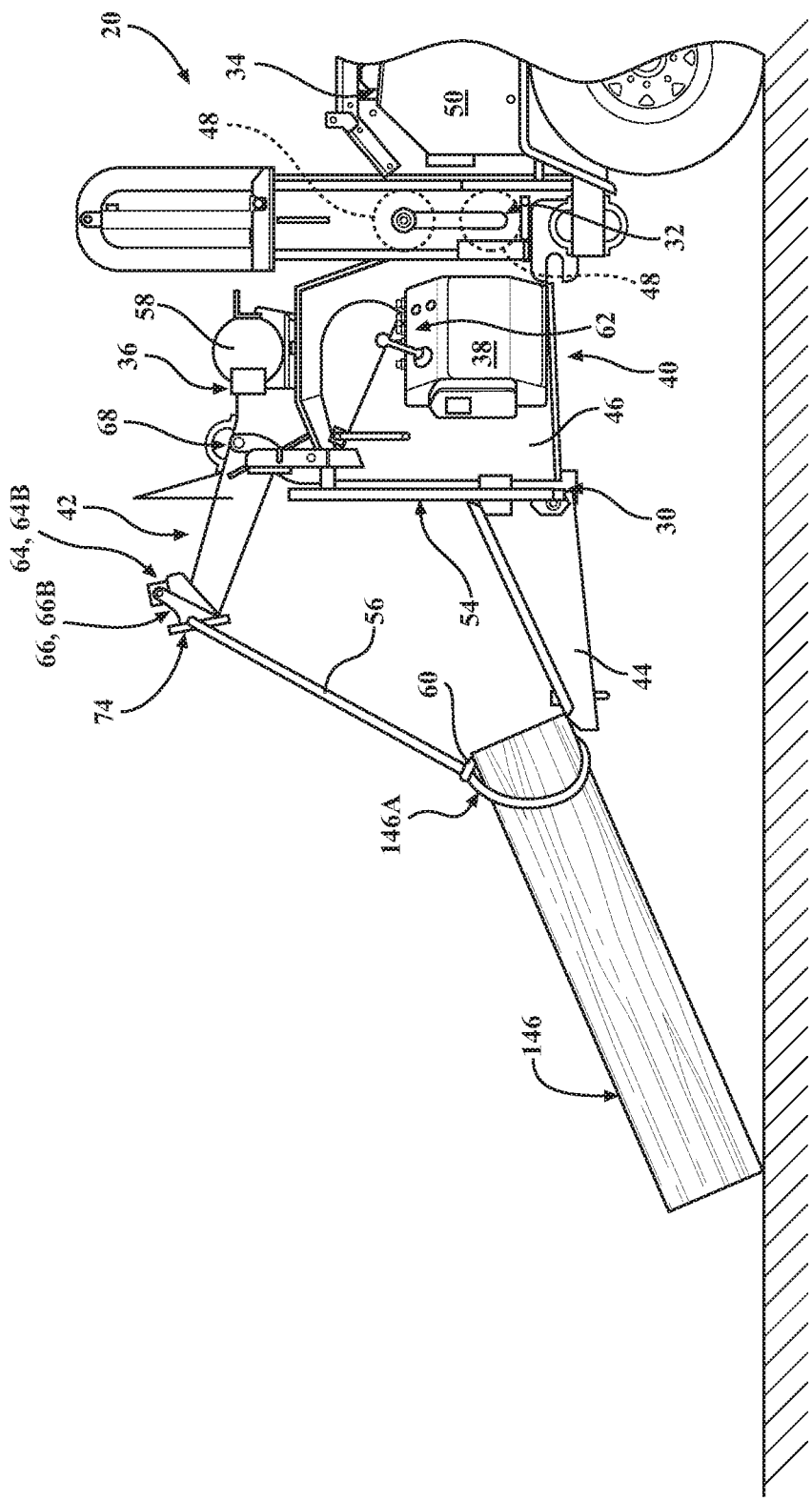
FIG. 9C is a third partial side view of the waste processing machine depicted in FIGS. 9A-9B shown with the log supported on an infeed tray of the infeed system, and with the winch line secured to the log at the first position.
Figure 9D:
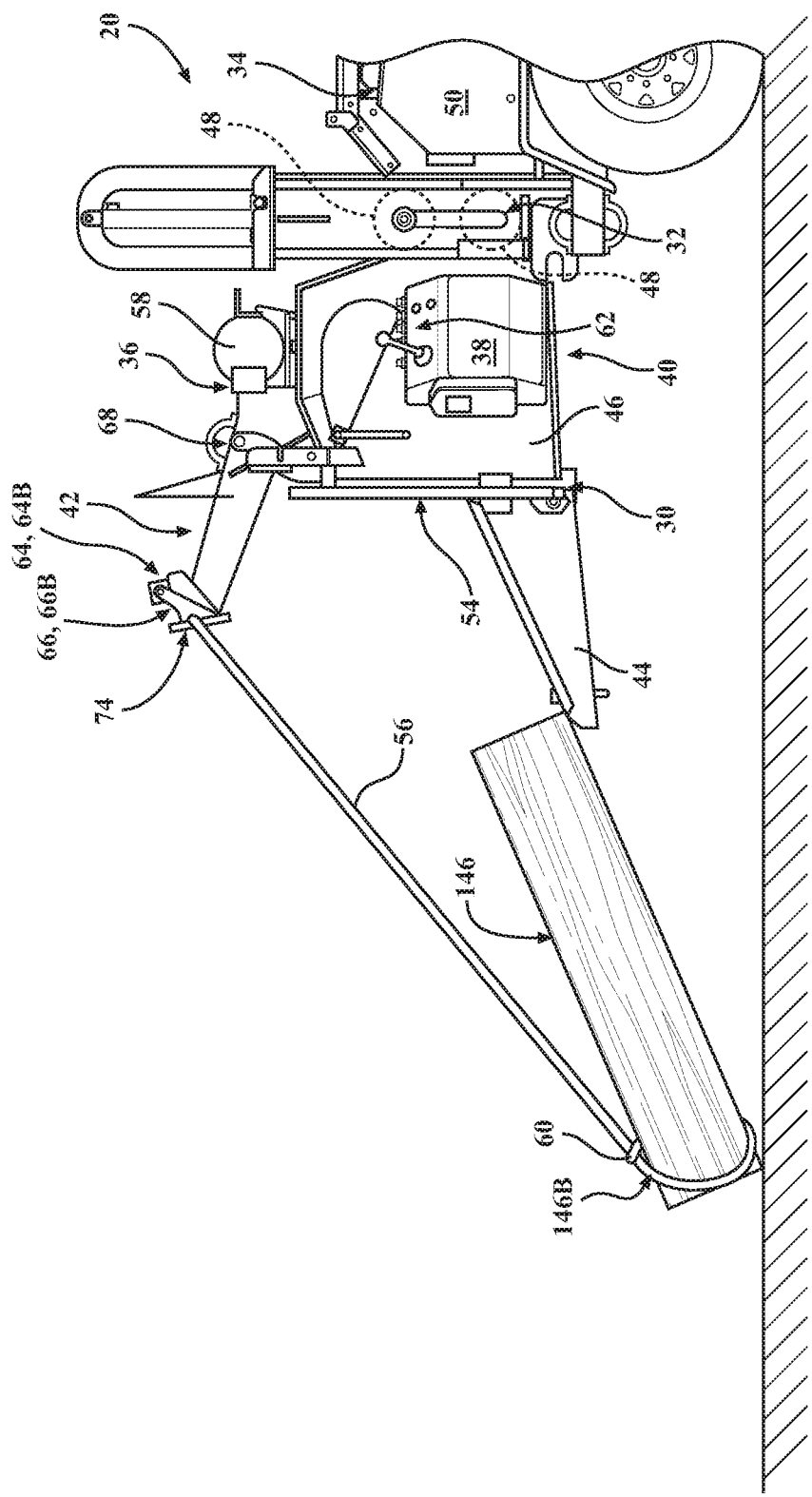
FIG. 9D is a fourth partial side view of the waste processing machine depicted in FIGS. 9A-9C shown with the log supported on the infeed tray, and with the winch line secured to the log at a second position.
Figure 9E:
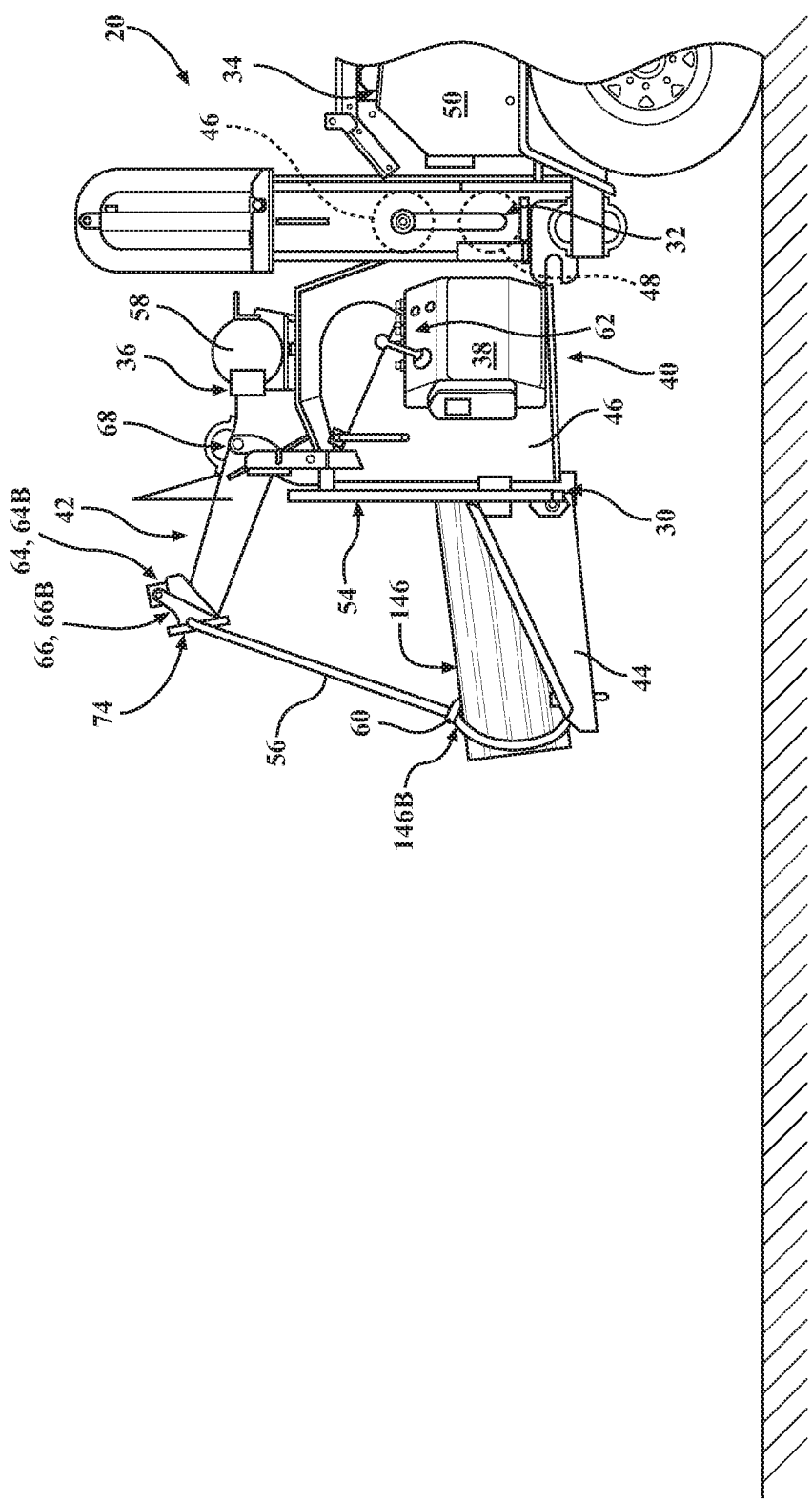
FIG. 9E is a fifth partial side view of the waste processing machine depicted in FIGS. 9A-9D shown with the log positioned in an infeed hopper of the infeed system, and with the winch line secured to the log at the second position.
Figure 9F:
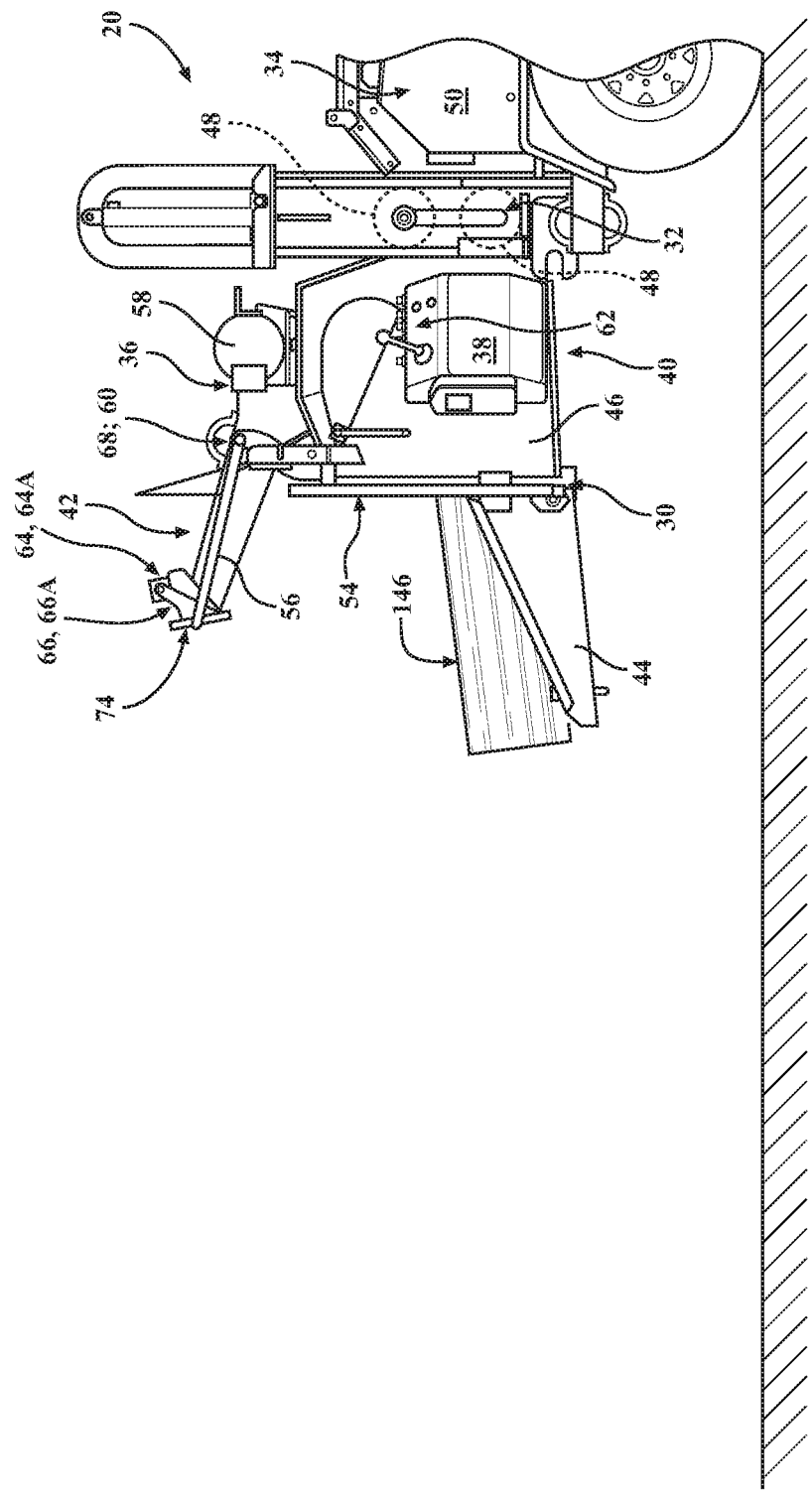
FIG. 9F is a sixth partial side view of the waste processing machine depicted in FIGS. 9A-9E shown with the log positioned in the infeed hopper, and with the winch line secured to the keeper of the winch docking safety system.

Referring now to FIGS. 9A-9F, certain steps are shown sequentially for directing a log, generally indicated at 146, into the waste processing machine 20. In FIG. 9A, the winch assembly 36 is shown in the docked configuration 64A with the line end 60 secured to the keeper 68. As noted above, the operator can utilize the feed assist system 40 to direct the log 146 towards the waste processing machine 20. To this end, the operator can move the switch 128 to the free spool position 128F (see FIGS. 8A-8B) to release tension in the winch line 56, and can then remove the line end 60 from the keeper 68 and pull the line end 60 towards the log 146. At this point, the line end 60 can be secured to the log 146 at a first position 146A on the log 146 (see FIG. 9B), and the operator can then move the switch 128 to the winch engaged position 128E (see FIGS. 8A-8B) to enable subsequent control of the winch assembly 36 via the handle arrangement 126, as noted above. Specifically, the operator can move the handle arrangement 126 from the neutral position 126N to the winch in position 126I (see FIGS. 8A-8B), which retracts the winch line 56 and begins to pull the log 146 and the line end 60 towards the guide 74, as shown in FIG. 9B. As the winch line 56 continues to retract and the log 146 is lifted off the ground, the log 146 can be positioned above the infeed tray 44. Next, the handle arrangement 126 can be moved to the winch out position 126OO to allow the operator to rest the log 146 on the infeed tray 44, as shown in FIG. 9C. Once tension has been released in the winch line 56, the operator can remove the line end 60 from the log 146 and reposition the line end 60 at a second position 146B on the log 146, as shown in FIG. 9D. To this end, the operator can either move the handle arrangement 126 to the winch out position 126O until the winch line 56 is released far enough to secure the log 146 at the second position 146B, or the operator can alternatively move the switch 128 to the free spool position 128F, move the line end 60 to secure the log 146 at the second position 146B, and subsequently move the switch 128 to the winch engaged position 128E. Next, the operator can move the handle arrangement 126 to the winch in position 126I, pulling the log 146 into the infeed hopper 46 as shown in FIG. 9E. Here, the operator can move the handle arrangement 126 depicted in FIG. 8A to the feed wheels winch in position 126C to simultaneously "creep" the feed wheels 48 onto the log 146 and pull the log 146 further into the infeed hopper 46 with the winch assembly 36. Alternatively, the operator can move the handle arrangement 126 depicted in FIGS. 8A-8B to the feed wheels position 126F to "creep" the feed wheels 48 onto the log 146 without using the winch assembly 36, or the operator can move both switches 140, 142 of the handle arrangement 126 depicted in FIG. 8B together to simultaneously "creep" the feed wheels 48 onto the log 146 and pull the log 146 further into the infeed hopper 46 with the winch assembly 36. Once the feed wheels 48 have engaged the log 146, the line end 60 can be subsequently secured to the keeper 68 and tightened against the docking subassembly 66 by moving the handle arrangement 126 to the winch in position 126I, as shown in FIG. 9F. When the winch line 56 is tightened, the docking sensor 64 determines that the winch assembly 36 is in the docked configuration 64A, and the feed system 32 can subsequently resume normal operation, such as via the control bar 54 noted above, to pull the log 146 into the rotor 50 of the cutting assembly 34.

Figure 10:
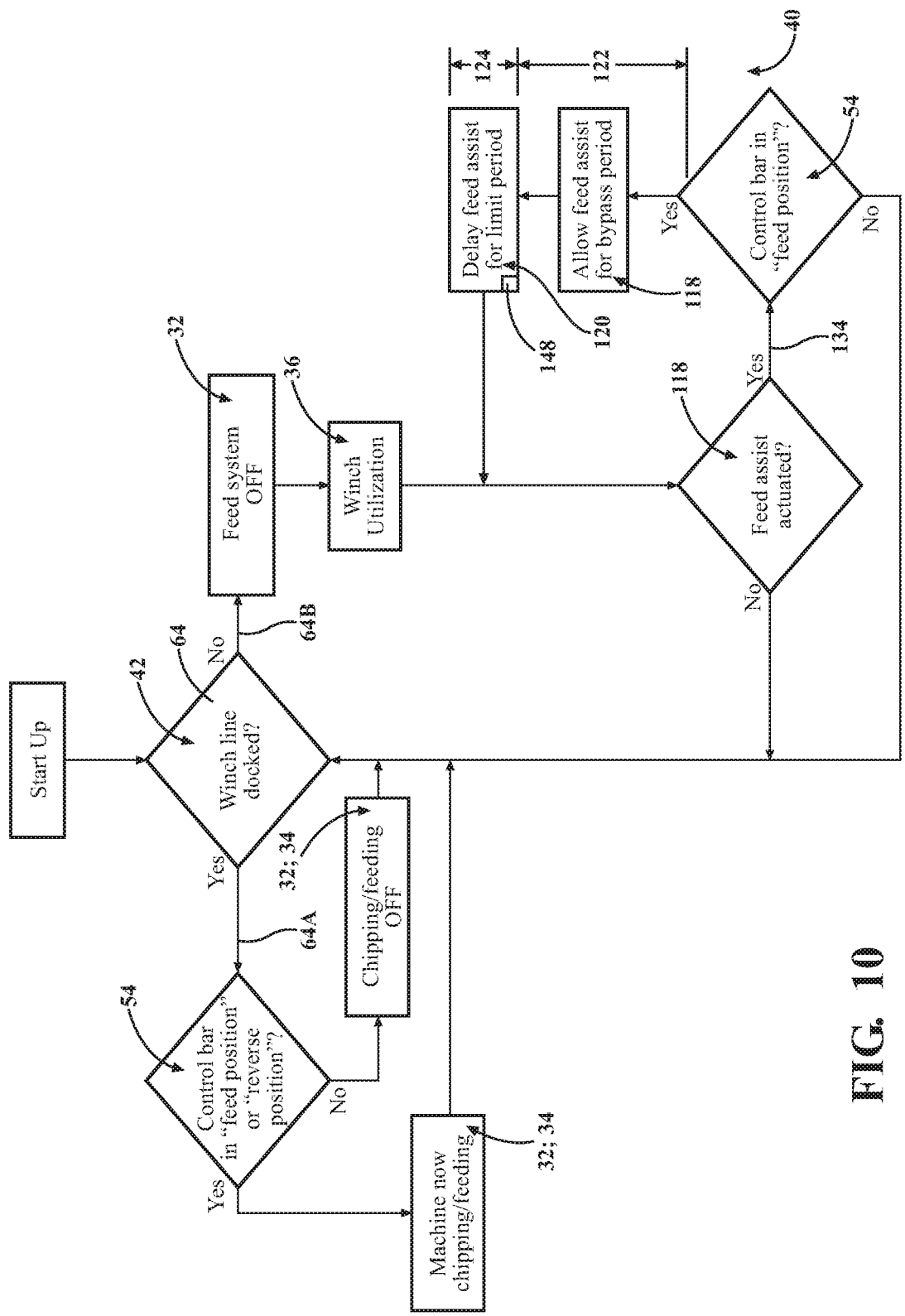
FIG. 10 is an exemplary logic map utilized by the feed assist system and waste processing machine of FIGS. 1A-1B.

Referring now to FIG. 10, an exemplary logic map utilized by the feed assist system 40 is shown. As described above, the feed assist system 40 cooperates with the winch docking safety system 42 to determine when the winch assembly 36 is in the docked configuration 64A via the docking sensor 64. If the winch assembly 36 is in the docked configuration 64A, normal operation of the feed system 32 and the cutting assembly 34 is effected via the control bar 54, as noted above. However, if the winch assembly 36 is in the undocked configuration 64B, the feed assist system 40 interrupts the feed system 32. Here, if the operator moves the handle arrangement 126 to the feed wheels position 126F or the feed wheels winch in position 126C to actuate the feed assist input 134, the feed assist system 40 activates the feed assist mechanism 118 to bypass the interrupted operation of the feed system 32 for the bypass period 122, such as to "creep" the feed wheels 48 of the feed system 32 onto a large object as noted above. During the bypass period 122, the operator may also retract the winch line 56 as discussed above. Once the bypass period 122 expires, the feed assist system 40 waits for the limit period 124 to expire before allowing successive activation of the feed assist mechanism 118 to be recognized. Here, the bypass period 122 serves as a forced delay which prevents the operator from consecutively "jogging" or "creeping" the feed wheels 48, which helps promote safety during use.

In one embodiment, one or more of the control unit 38 and the feed assist system 40 are configured to ignore actuation of the feed assist input 134 of the feed assist mechanism 118 during the limit period 124. To this end, and as is depicted schematically in FIG. 10, the limit mechanism 120 may comprise a timer 148 configured to override the operation of the feed assist mechanism 118 during the limit period 124 following the bypass period 122. In this embodiment, the limit period 124 is time-based. Thus, it will be appreciated that the timer 148 can be realized as a discrete component (for example, a module in communication with the electrical switch 144), by software or code (for example, a program running on a microcontroller in communication with the control unit 38), or with any other component or feature sufficient to implement the limit period 124 based on time.

It will be appreciated that the bypass period 122 and/or the limit period 124 can be established with time, with speed or angle (for example, of the feed wheels 48), or with any other suitable basis, without departing from the scope of the present invention. In one embodiment, both the bypass period 122 and the limit period 124 are time-based, and the limit period 124 is longer than the bypass period 122. However, those having ordinary skill in the art will appreciate that the bypass period 122 and the limit period 124 can be established or otherwise set based on different criteria. By way of non-limiting example, the bypass period 122 could be based on rotation of the feed wheels 48, and the limit period 124 could be based on time. Furthermore, it will be appreciated that the limit period 124 can also be based on feedback from sensors or components of the waste processing machine 20, and/or the relative position of the handle arrangement 126 or other input controls. By way of non-limiting example, the limit period 124 could be for two seconds and also require that the handle arrangement 126 return to the neutral position 126N before being returned to either the feed wheels position 126F or the feed wheels winch in position 126C to actuate the feed assist mechanism 118 again.

The feed assist system 40 of the present invention disclosed herein significantly reduces safety issues in connection with waste processing machines 20 enabling operators to use the winch assembly 36 together with limited use of the feed system 32 to advance waste material towards the cutting assembly 34 in a safe manner by preventing the winch line 56 from being captured by the feed system 32. Thus, physical injuries to operators and other bystanders, as well as damage to the waste processing machine 20 and other property, may be averted. Moreover, the feed assist system 40 affords significant advantages concerning usability, functionality, and operation of waste processing machines 20 by allowing operators limited use of the feed system 32 together with the winch assembly 36 to advance large waste materials into the feed system 32 and towards the cutting assembly 34 safely and efficiently.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A waste processing machine for reducing waste material and having a feed assist system, comprising:
    a frame;
    a cutting assembly disposed on said frame for reducing the waste material;
    a feed system disposed on said frame for directing the waste material toward said cutting assembly;
    a winch assembly for directing the waste material toward said feed system, said winch assembly comprising a winch line extending to a distal line end for securing the waste material, and a winch driver coupled to said frame and in communication with said winch line to urge said distal line end toward said winch driver;
    a keeper fixedly coupled to said frame to secure said distal line end to said frame;
    a winch docking safety system comprising a docking sensor arranged to detect utilization of said winch assembly between a docked configuration with said winch line tensioned between said winch driver and said distal line end and with said distal line end secured to said keeper, and an undocked configuration with said winch line loosened between said winch driver and said distal line end;
    a control unit in communication with said feed system and said docking sensor to allow operation of said feed system when said winch assembly is in said docked configuration, and to interrupt operation of said feed system when said winch assembly is in said undocked configuration;
    a feed assist mechanism in communication with said control unit and arranged for actuation to bypass said interrupted operation of said feed system when said winch assembly is in said undocked configuration to allow said feed system to advance the waste material toward said cutting assembly for a predetermined bypass period; and
    a limit mechanism in communication with said control unit to prevent operation of said feed assist mechanism for a predetermined limit period immediately following said bypass period.

2. The waste processing machine as set forth in claim 1, wherein said limit mechanism comprises a timer configured to override operation of said feed assist mechanism during said limit period following said bypass period, said limit period being time-based.

3. The waste processing machine as set forth in claim 1, wherein at least one of said bypass period and said limit period are time-based.

4. The waste processing machine as set forth in claim 1, wherein said bypass period and said limit period are time-based; and
    wherein said limit period is longer than said bypass period.

5. The waste processing machine as set forth in claim 1, wherein said feed assist mechanism comprises a feed assist input disposed in communication with said control unit and arranged for momentary actuation to bypass said interrupted operation of said feed system.

6. The waste processing machine as set forth in claim 5, wherein said feed assist input is arranged for actuation by an operator of said waste processing machine.

7. The waste processing machine as set forth in claim 5, wherein said control unit is configured to ignore actuation of said feed assist input during said limit period.

8. The waste processing machine as set forth in claim 1, further comprising a docking subassembly arranged for movement between a docked position corresponding to said docked configuration, and an undocked position corresponding to said docked configuration, said docking subassembly including:
    a base operatively attached to said frame; and
    a hanger shaped to engage said winch line in said docked position.

9. The waste processing machine as set forth in claim 8, wherein said docking sensor is arranged to abut at least a portion of said docking subassembly in said docked configuration.

10. The waste processing machine as set forth in claim 8, wherein said docking subassembly further comprises a biasing element interposed between said base and said hanger to urge said hanger away from said docked position and toward said undocked position.

11. The waste processing machine as set forth in claim 8, wherein said docking subassembly is spaced from said keeper.

12. The waste processing machine as set forth in claim 1, wherein said docking sensor comprises a limit switch.

13. The waste processing machine as set forth in claim 1, wherein said keeper comprises a keeper mount operatively attached to said frame, and a receiver spaced from said keeper mount to secure said distal line end of said winch line.

14. The waste processing machine as set forth in claim 13, wherein said receiver of said keeper is further defined as an aperture.

15. The waste processing machine as set forth in claim 1, wherein said cutting assembly is configured to operate when said winch assembly is in said docked configuration and also when said winch assembly is in said undocked configuration.

\* \* \* \* \*